US006549725B1

(12) United States Patent
Shibayama et al.

(10) Patent No.: US 6,549,725 B1
(45) Date of Patent: Apr. 15, 2003

(54) HEATING SYSTEM FOR USE WITH A TRANSPORT CARRIER

(75) Inventors: Hisashi Shibayama, Yokkaichi (JP); Yoshihiro Araki, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 213 days.

(21) Appl. No.: 09/695,031

(22) Filed: Oct. 25, 2000

Related U.S. Application Data

(62) Division of application No. 09/257,508, filed on Feb. 25, 1999.

(30) Foreign Application Priority Data

Feb. 26, 1998 (JP) .......................................... 10-45955
Mar. 11, 1998 (JP) .......................................... 10-60056

(51) Int. Cl.[7] .......................... H01R 43/00; H02G 1/00

(52) U.S. Cl. ...................... 392/418; 392/423; 219/521; 269/239; 269/903

(58) Field of Search ............................ 392/418, 422, 392/423, 424, 416, 411–415; 219/521, 385, 201, 388, 85.12, 85.13; 156/272.2; 34/266; 174/88 R, 84 R; 269/901, 903, 239

(56) References Cited

U.S. PATENT DOCUMENTS 1,516,054 A * 11/1924 Mottlau ..................... 392/418
2,355,459 A * 8/1944 Miskella ..................... 34/266
2,562,146 A * 7/1951 Hultkrans ................ 156/272.2
3,420,982 A * 1/1969 Hager, Jr. ................ 156/272.2
3,732,066 A * 5/1973 Kipple et al. ................ 432/49
3,805,019 A * 4/1974 Gorishek .................... 392/420
4,024,009 A * 5/1977 Amsden et al. .......... 156/272.2
4,216,369 A * 8/1980 Burtelson ................... 219/411
4,325,762 A * 4/1982 Burmeister et al. ...... 156/272.2
4,411,608 A 10/1983 Yanagisawa
5,302,411 A * 4/1994 Toth ............................. 427/8
5,316,789 A 5/1994 Ookuma et al.
5,456,791 A 10/1995 Ueno
5,587,096 A * 12/1996 Huvard et al. .............. 392/418
5,641,943 A 6/1997 Sawamura
5,846,476 A * 12/1998 Hwang et al. .............. 264/493
5,901,441 A 5/1999 Kawamura et al.
6,042,755 A 3/2000 Matsumoto
6,382,612 B1 * 5/2002 Shibayama et al. ......... 269/239

FOREIGN PATENT DOCUMENTS

| | | | | |
|---|---|---|---|---|
| DE | 3002476 | * | 7/1981 | |
| EP | 644639 | | 3/1995 | |
| GB | 618978 | * | 3/1949 | ................. 392/414 |
| JP | 7-94253 | | 4/1995 | |
| JP | 8-33163 | | 2/1996 | |
| JP | 9-182254 | | 7/1997 | |

* cited by examiner

*Primary Examiner*—John A. Jeffery
(74) *Attorney, Agent, or Firm*—Greenblum & Bernstein, P.L.C.

(57) ABSTRACT

The present invention relates to a heating system for use with a transport carrier. The present invention makes the workability of a transport carrier compatible with the maintenance of positioning accuracy and imparts a general-purpose property. An electric wire-hanging member is provided on which a plurality of bundles of electric wires are hung in a parallel. A holder is provided for retaining the electric wire-connecting parts which are formed in bundles of electric wires on the electric wire-hanging member. Further, an electric wire sandwiching system for regulating the retention of at least the electric wire-connecting parts side of the bundles of electric wires which are hung on the electric wire-hanging member and for releasably retaining the connected bundles of electric wires. The above device provides support for the bundles of electric wires in a condition in which a dimension of a terminal part of the bundles of electric wires is maintained at a fixed position, independently of the length of the bundles of electric wires. Further, the electric wire sandwiching system for the bundles of electric wires is capable of releasing, and the mounting and removal of the bundles of electric wires can be easily carried out by the retaining mechanism.

6 Claims, 18 Drawing Sheets

HEATING SYSTEM FOR USE WITH A TRANSPORT CARRIER

CROSS-REFERENCE TO RELATED APPLICATIONS

This application is a division of U.S. application Ser. No. 09/257,508, filed Feb. 25, 1999, and entitled "Transport Carrier, Heating System for Use Therewith, and Method for Covering a Wire Connection Part". This application also relates to copending U.S. application Ser. No. 09/695,037, filed Oct. 25, 2000, and entitled "Method for Covering a Wire Connection Part".

BACKGROUND OF THE INVENTION

1. Field of the Invention

In general, a wireharness and a subassembly constituting a wireharness (hereinafter, referred to as "wire assembly") are electric wiring systems forming a plurality of circuits, in which a plurality of circuit wires are connected at the same contact point. The present invention relates to a device, and a method, for covering a wire connection part in such a system, and to a heating device for use therewith.

2. Description of Background Information

In order to perform such construction of a circuit, a process of executing stripping of the ends of a plurality of different electric wires, a removal process of selecting those required to form the wire assembly from a plurality of electric wires arranged to be removed, a connecting process of executing a terminal-connecting processing to the terminal ends of respective electric wires removed, and a covering process for covering in order to protect the electric wire-connecting part of electric wires so connected (mainly water-protection), have to be carried out.

Further, the core wires are bundled together at the stripped terminal ends of covered electric wires and the terminal ends are united by an electric welding, which forms the electric wire-connecting part in the above-mentioned terminal-connecting processing.

Also, in the above-noted covering process, it is required to cover the wire connection part which is to be protected with a resin covering material, to have a filler for sealing interposed between the covered wire connection part and the covering material, and to cure the filler.

According to known automatic water-proofing processes as disclosed in Japanese Laid-open Publication No. HEI-7-94253 and the molding process as disclosed in Japanese Patent Laid-open Publication No. HEI-8-33163, there is disclosed a construction in which a molding material (mold) having a recess in which a filler is to be injected is circulated on a conveyer, the wire connection part is fitted into a recess of each member, which is surrounded, and a filler is injected and cured.

In adopting the construction to cover the wire connection part with a covering material using a filler as a sealing agent as above, it is often a difficult and time consuming job to cure the filler in a suitable manner. Therefore, in the prior art apparatus referred to above, curing of the filler is accelerated by heating or cooling the material to be circulated on the conveyor according to the properties of the filler.

Additionally, since the above-mentioned known devices all have constructions to heat or cool the recess surrounding the wire connection part, it is possible to cure the filler in a relatively short period of time.

However, due to the installation and removal of the bundle of wires into and out of the recess, such work is required to be frequently practiced. Such installation and removal is extremely laborious, and contrary to the work efficiency in pursuing a flow process from the wire removal process to the covering process.

Additionally, in order to efficiently carry out the above-mentioned respective processes, it is preferable to keep a bundle of electric wires transportable and to be able to mount and remove it so that the bundle of electric wires which were bundled in the removal process of electric wires can maintain a position suitable for respective processes (or change to a position suitable for respective processes). However, since the bundle of electric wires are soft articles having some elasticity, it has been difficult to ensure that the ease of mounting and removal is compatible with the maintenance of positioning accuracy because of peculiarities, such as a bending and the like. Further, the bundles of electric wires treated in one factory includes various kinds and different lengths. Therefore, it has been much more difficult to efficiently transport a plurality of kinds of the bundles of electric wires using the same transport procedure.

SUMMARY OF THE INVENTION

The present invention was completed, considering the above-mentioned problems, and one aspect of the present invention is to make the working property compatible with the maintenance of positioning accuracy and further to provide a transport carrier and heating system using thereof.

In order to solve the above-mentioned problems, the present invention includes a transport carrier for transportably supporting bundles of electric wires, in which electric wire-connecting parts are formed at one end during a plurality of processes. The transport carrier includes an electric wire hanging member on which a plurality of the bundles of electric wires are hung in a folded, parallel condition, and also includes a holder for retaining the electric wire-connecting parts which are formed on the respective the bundles of electric wires. Furthermore, a retaining device is also provided for regulatably retaining at least the electric wire-connecting parts side of the bundles of electric wires which are hung on the electric wire-hanging member and for releasably retaining the bundles of electric wires.

One aspect of the present invention is also directed to providing a method of covering the wire connection part by which the handling of the bundle of wires can be easily carried out, and the handling can be facilitated by completing the covering process using the filler in a short period of time.

In another aspect of the present invention, the bundles of electric wires WB are supported in a condition in which a fixed dimension from the terminal part is maintained, by retaining the bundles of electric wires by retaining procedures in a condition in which the electric wire-connecting parts or the parts in which the electric wire-connecting parts are formed (hereinafter, referred to as "terminal parts") are positioned against the holder in order to execute a plurality of processings on the bundles of electric wires at the time of the hanging in folded condition on the wire-hanging member. Further, since the retaining procedures are formed in a condition in which the bundles of electric wires are releasable, the mounting and removal of the bundles of electric wires WB can be easily carried out.

In another aspect of the present invention, the transport carrier is further equipped with a receptacle which is provided on the electric wire-hanging member and which accommodates the bundles of electric wire on an opposite side of the electric wire-connecting parts. In this aspect of the present invention, the bundles of electric wires can be loaded in a condition in which the bundles of electric wires are protected, regardless of the length of the bundles of electric wires, by accommodating the remainder of the bundles of electric wires which were hung in folded condition on the wire-hanging member.

In a further aspect of the present invention, the retaining device is provided on the upper end part of the electric wire-hanging member, and includes a resilient member having clamping slits forming a clamping part on which the electric wire-connecting parts of the bundles of electric wires are mounted and having guide slits provided at an opposite side of the resilient member. In this aspect of the invention, at the time of hanging the bundles of electric wires, the bundles of electric wires first can be relatively easily clamped by introducing the bundles of electric wires into the clamping slits. It is thus possible to complete the work simply by holding the bundles of electric wires and removing from both slits when the bundles of electric wires are to be separated.

According to a further aspect of the present invention, the above-mentioned retaining device is fixed on the electric wire-hanging member, and a fixed rib extends in a direction crossing with the hanging bundles of electric, and a pair of pressure members is arranged along a stretcher direction of the bundles of electric wires in a condition in which the fixed rib is sandwiched. Additionally, a connecting member is provided for connecting the pressure members with the electric wire-hanging member so that the pressure members are capable of changing their position relative to the fixed rib, between a sandwiching position in which respective pressure member sandwich the bundles of electric wires in cooperation with the fixed rib and a releasing position for releasing the bundles of electric wires from between the pressure members and the fixed ribs. In accordance with this aspect of the invention, the fixed rib which extends in parallel with the pressure member to press the bundles of electric wires in cooperation with the fixed rib are provided when the bundles of electric wires are retained, the retaining of a plurality of the bundles of electric and the release thereof can be carried out simultaneously by operating the connecting member.

In a further aspect of the present invention, the fixed rib is configured as a resilient member for elastically receiving the bundles of electric wires. According to this aspect, when the bundles of electric wires are sandwiched in cooperation with the pressure members, the bundles of electric wires can be resiliently pressed against the fixed ribs, and as a result, it is possible to obtain a large stopping force without damaging the bundles of electric wires, due to the resilience of the fixed rib.

In another aspect of the present invention, the holder retains the bundles of electric wires in a released condition by a pair of heat resistant metal plates which are mounted at spaced intervals allowing insertion of the electric wire-connecting parts of the bundles of electric wires. In accordance with this aspect of the invention, since the holder retains the electric wire-connecting parts, an established treatment (for example, a heating treatment and a visual inspection) can be carried out to the electric wire-connecting parts in a condition in which the electric wire-connecting parts are retained in the holder. Further, as a pair of heat resistant metal plates insertion of the electric wire-connecting parts are adopted, the pair of metal plates reflect heat as reflection boards when a heating treatment is carried out to the electric wire-connecting parts, and which contributes to the enhancement of atmospheric temperature.

According to still another aspect of the present invention, the holder includes supporting members which partition the insertion holes capable of individual insertion in order to support a plurality of the electric wire-connecting parts, and the supporting members are divided so that the respective insertion holes can be released in a half divided form. According to this aspect of the invention, a plurality of the electric wire-connecting parts which are inserted into the insertion holes of the supporting member and retained can be released simultaneously.

In accordance with another aspect of the invention, the holder has supporting members which partition the insertion holes for individual insertion in order to support a plurality of the electric wire-connecting parts, and connecting members are provided which connect the supporting members to the wire-hanging member in a condition capable of mounting and removing. According to this aspect of the invention, the respective electric wire-connecting parts can be released simultaneously by removing the supporting members which support the electric wire-connecting parts from the wire-hanging member.

In another aspect of the present invention, a heating system is provided for curing a filler by heating, after covering the electric wire-connecting parts which are formed on the terminal of the bundles of electric wires with a cap-shape cover in which a fixed amount of a liquid filler is previously injected. The transport carrier described above with respect to other aspects of the present invention may be utilized with the heating system. The heating system includes a heat source having a circular cross-section and which faces in parallel with the pair of supporting boards which are provided on the transport carrier. Furthermore, the center of the heat source is positioned at about the same height as the level of the filler, and the lower part of the pair of supporting boards is spaced downwardly from the filler level by about a radius of the heat source. According to this aspect of the present invention, during a process of heating, heat from the heat source is efficiently radiated between the pair of the supporting boards, and the level of the filler positioned between them is cured. Additionally, as the lower supporting board among the pair of supporting boards is lower than the filler level by about the radius of the heat source, the volume of the filler (heat capacity) arranged between the pair of supporting boards becomes a minimum condition within a region in which temperature subjected to heat-radiation is high.

In a further aspect of the invention, a transport carrier is provided for transportably supporting, during a plurality of processes, a bundle of electric wires in which electric wire-connecting parts are formed on one end of each bundle of wires. The transport carrier includes an electric wire-hanging member on which a plurality of bundles of electric wires are hung in a parallel folded condition, a holder for retaining the electric wire-connecting parts which are formed on respective bundles of electric wires, and retaining mechanism capable of regulatably retaining at least the electric wire-connecting parts side of the bundle of electric wires hung on the electric wire-hanging member, while releasably retaining the bundle of electric wires.

According to another aspect of the invention, the transport carrier may further include a receptacle provided on the electric wire-hanging member which accommodates an end part of the bundles of electric wires opposite to the electric wire-connecting parts, the retaining mechanism may be provided on an upper end part of the electric wire-hanging member, and the retaining mechanism may further include a resilient body having at least one slit for clamping a part on which the electric wire-connecting part of an electric wire bundle is formed and at least one guide slit provided opposite to the electric wire-connecting part of the at least one slit for clamping.

In another aspect of the invention, the retaining mechanism of the transport carrier may be fixed on the electric wire-hanging member, and the retaining mechanism may further include a fixed rib extending in a direction crossing with at least one bundle of electric wires that are hung, and a pair of pressure members may be arranged along a crossing direction of the bundle of electric wires in a condition in which the fixed rib is positioned therebetween. At least one pivoting arm may be pivotally connected with an electric wire-hanging member so that each pressure member is movable relative to the fixed rib between a sandwiching position in which the respective pressure members integrally support and sandwich a bundle of electric wires together with the fixed rib and a releasing position for releasing the bundle of electric wires from between the pressure members and fixed rib. Furthermore, the fixed rib may be formed from a resilient member for engagement with the bundle of electric wires.

In a further aspect of the present invention, the holder of the transport carrier may retain a bundle of electric wires in a releasable condition by a pair of heat resistant metal plates mounted at spaced intervals which permit insertion of the electric wire-connecting parts of the electric wires bundle. The holder may also include at least one supporting member having a plurality of insertion holes allowing individual insertion of and support for a plurality of electric wire-connecting parts, and the supporting members may be divided such that the respective insertion holes can be release in a half-divided form. Additionally, the holder may include supporting members which form insertion holes which permit individual insertion in order to support a plurality of the electric wire-connecting parts and connecting members which allow removable connection of the supporting members to the wire-hanging member.

In another aspect of the present invention, a heating system may be provided for curing a filler by heating, after covering an electric wire-connecting part which is formed on a terminal of an electric wire bundle by use of a cap-shaped cover into which a fixed amount of liquid filler is preliminarily injected, by using the transport carrier constructed and arranged as set forth above. The heating system may include a heat source having a circular cross-section, and the heat source may be positioned generally parallel with and between the supporting boards. Additionally, a hood shaped reflector having reflection boards may also be provided which open between the above-mentioned pair of supporting boards, with the center of the heat source being set at about the same height as the level of filler, and a lower part of the pair of supporting boards may be spaced downwardly from the level of filler by a radius of the heat source.

Another aspect of the invention includes a method for covering a wire connection part, including removing a plurality of electric wires and conveying the wires by a conveying device, electrically connecting core parts of the wires at exposed terminal ends thereof to form a wire connection part, covering the wire connection part with a covering material having insulation properties, and filling a filler for sealing in a gap between the covering material and the wire connection part. The method further includes injecting a filler having thermosetting properties into a covering material having a cap-shaped form, covering the wire connection part with the injected covering material, conveying the covered wire connection part by the conveying device, and heating the liquid surface of the filler at a set position relative to a heat source of a heating device.

In a further aspect of the invention, the method for covering a wire connection part may further include surrounding the covering material with a pair of spaced reflector plates provided on the conveying device and spaced upwardly and downwardly relative to the filler, and positioning the space between the pair of reflector plates to face toward the heat source of the heating device.

According to another aspect of the present invention, the method for covering a wire connection part may further include covering the heat source with a hood-shaped reflecting plate which opens only between the pair of supporting plates, forming the heat source to have a circular cross-section, and arraying a lower one of the pair of supporting plates below a center of the heat source and at about an upper level of the filler by a radius of the heat source.

BRIEF DESCRIPTION OF THE DRAWINGS

The above and other features and advantages of the present invention will be made apparent from the following description of the preferred embodiments, given as non-limiting examples with reference to the accompanying drawings, in which.

DETAILED DESCRIPTION OF THE PREFERRED EMBODIMENTS

A first embodiment of the present invention will now be described in detail below, referring to the attached drawings.

Figure 1A:
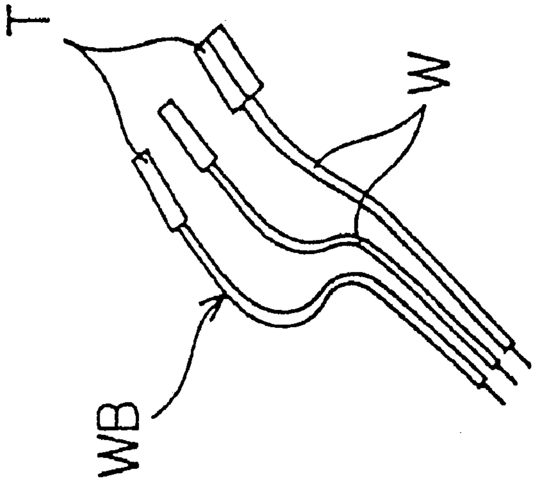
FIGS. 1(A)–1(C) illustrate generally the covering method relating to a mode of operation in the present invention.
Figure 1B:
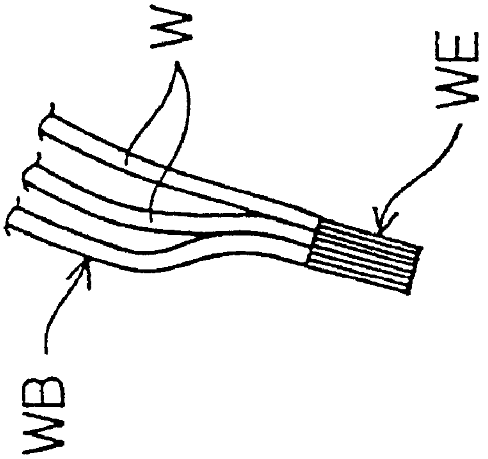
Figure 1C:
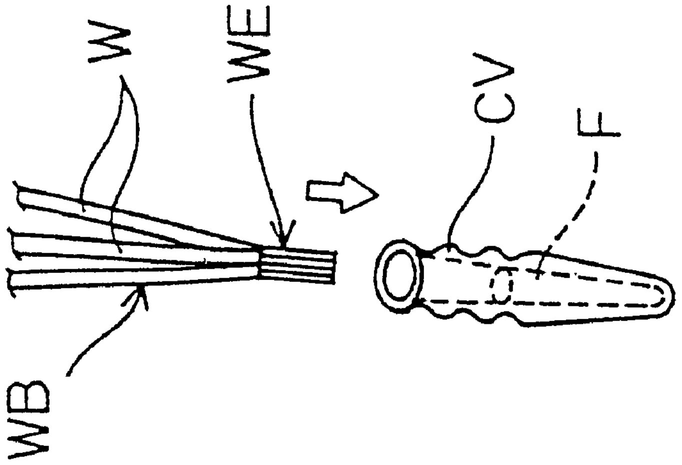

FIGS. 1(A) to 1(C) illustrate an assembly method relating to the first embodiment of the present invention. Referring to FIGS. 1(A)–1(C), in the mode of operation illustrated, bundles of electric wires WB are formed by crimping terminal fittings T on one end and taking out the length-adjusted covered electric wires W to which a stripping processing was executed. As shown in FIG. 1(A), the electric wire-connecting part WE is formed by collecting the stripped parts and executing a resistance welding, as shown in FIG. 1(B), and the electric wire-connecting parts WE formed are covered with a cap-shaped cover CV and the covering process is executed, as shown in FIG. 1(C). In the above-mentioned cover CV, a filler F is provided, for example, by a two-liquid type urethane which is previously injected in a fixed amount. The filler F may be provided in liquid form, and may have thermosetting properties.

Figure 2:
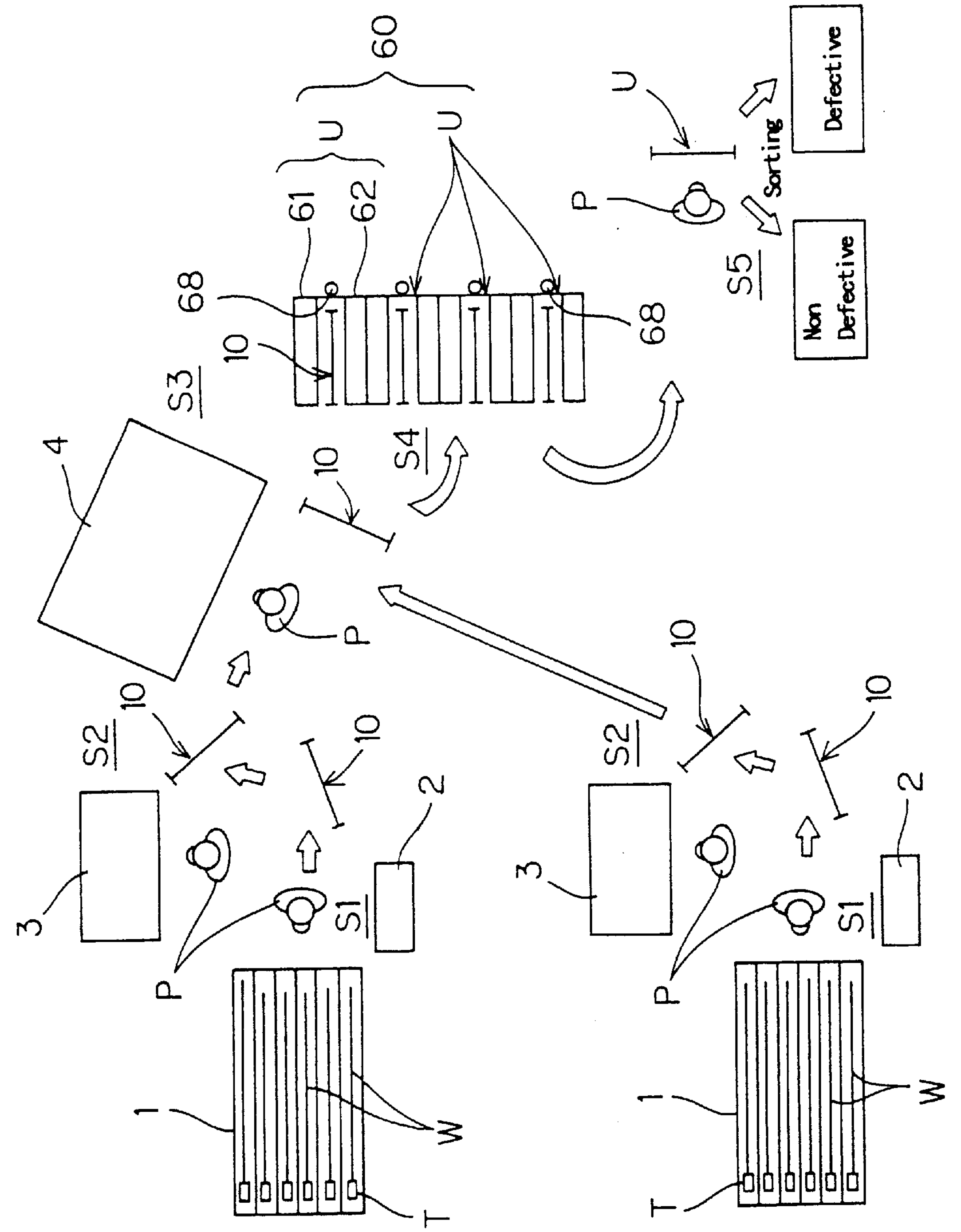
FIG. 2 is a schematic plan view showing a production line of the subassembly which embodies the covering method of FIG. 1.

FIG. 2 is a schematic plan view showing a production line of subassembly which embodies the covering method of FIG. 1. Referring to FIG. 2, in the production line of the embodiment illustrated, an electric wire removal station S1 is provided for selecting and removing the electric wires required for the wire assembly. The wire removal station S1 includes a plurality of different electric wires W which are stocked on an electric wire stock table 1 in a condition in which a stripping processing was previously executed on the end thereof. A terminal-connecting station S2 is provided for performing a terminal-connecting process which unites, by an electric welding process, the terminals of respective electric wires removed. A covering station S3 is provided for covering and protecting the cover CV to which the filler F is previously injected, and a curing station S4 is provided for curing the electric wire-connecting part WE, covered with the cover CV having the above-mentioned filler F, by heating. A sorting station S5 is provided for separating a product which has finished the curing process into an acceptable article or a rejected article. Workers P are arranged at the respective stations S1 to S5, and the workers P carry out the work at the respective stations S1 to S5.

A transport carrier 10 described as follows is utilized at the division of labor. The worker P of the station S1 bundles the electric wires W selected from the electric wire stock table 1, the bundles are temporarily connected by a taping device 2, and each bundle of electric wires WB is folded to hang on the transport carrier 10. Then a worker P of the station S2 executes resistance welding of the terminals of the bundles of hanging electric wires WB, and the worker P of the station S3 installs the cover CV, to which the filler F is previously injected by the filler injecting device 3. Next, curing of the filler F takes place on the transport carrier 10 at the curing station S4, and then the worker P of the sorting station S5 carries out final sorting work, where the bundles of electric wires are removed from the transport carrier 10. As the above-mentioned electric wire stock table 1, the taping device 2, the resistance welding device 3 and filler injecting device 4 themselves are well known, the detailed illustration thereof is abbreviated. In the mode of operation illustrated, the covering process is carried out by the above-mentioned stations S4 and S5.

Figure 3:
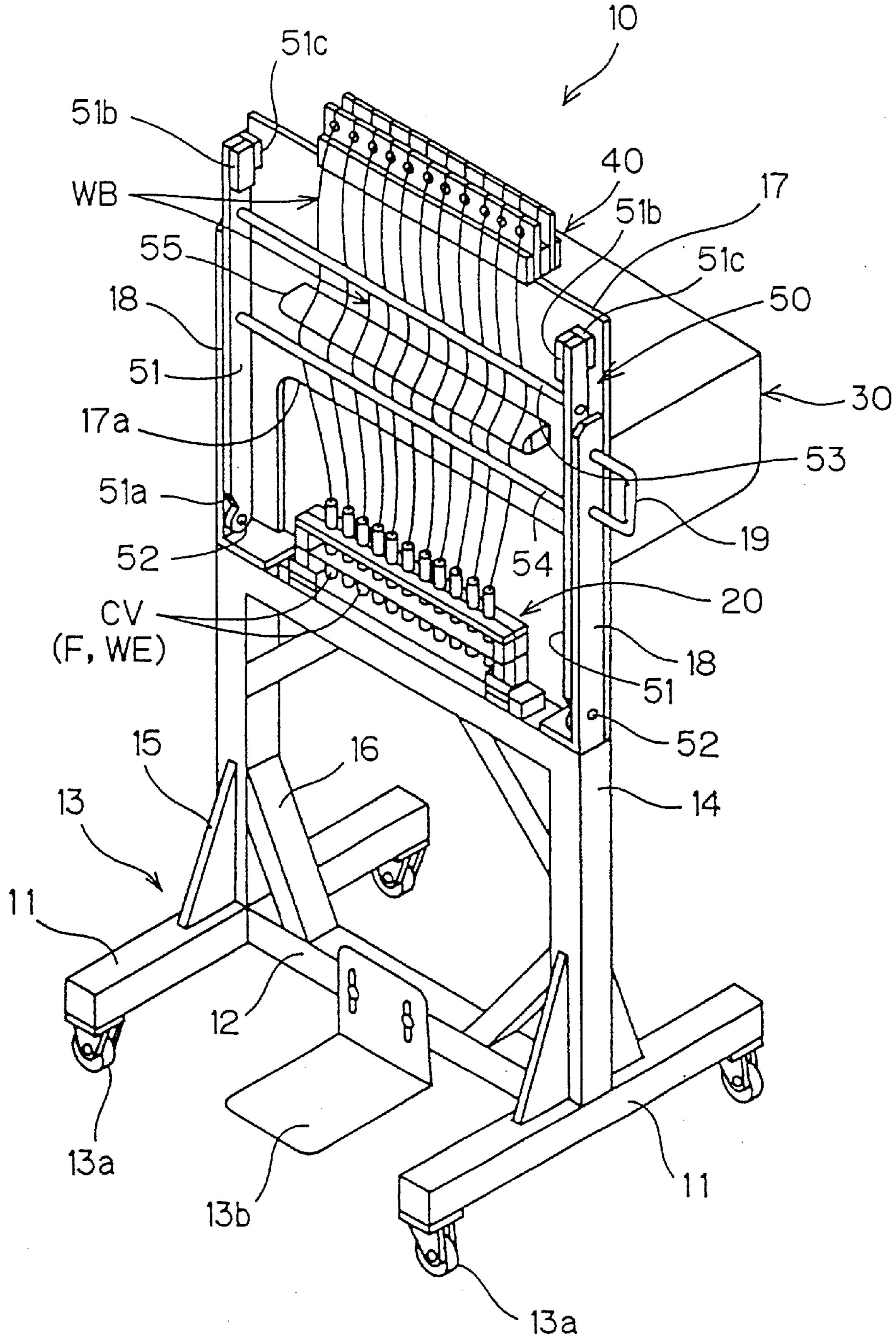
FIG. 3 is a perspective view showing the general construction of a transport carrier adapted to a mode of operation of the present invention.

In order to transfer the electric wires W between respective stations S1 to S5, the transport carrier 10 is used in the mode of operation illustrated and is described in detail below. FIG. 3 is a perspective view of the transport carrier 10 according to one embodiment of the present invention. Referring to the same figure, the transport carrier 10 includes an H-shaped base 13 formed from a pair of parallel side frames 11 forming a pair of parallel legs. The center part of the respective side frames 11 are interconnected by a connecting part 12. The base 13 includes casters 13*a* at each end of side frames 11. Further, in the illustrated embodiment, an L-shaped stepping board 13*b* is attached to connecting part 12, for example, by screws. Stepping board 13*b* facilitates placement and removal of the bundles of electric wires WB onto the transport carrier 10, and the movement of the base 13 by the casters 13*a* can be controlled by stepping on the free end side of stepping board 13*b* by the worker.

An upright lower frame 14 having a generally inverted U-shape, as seen in a front view, is arranged at the central part of the side frames 11 and is affixed thereto. The lower frame 14 is fixed to the side frames 11, for example, by welding and reinforcing members 15 and 16 are also fixed to the respective side frames 11 and lower frame 14 to provide reinforcement. Additionally, a wire-hanging board 17 is installed upright on the upper part of the lower frame 14 by supporting frames 18 fixed on both sides of the wire-hanging board 17, and therefore, the wire-hanging board 17 is reinforced. In the embodiment illustrated, a handle 19 is fixed on one of the supporting frames 18.

A recessed part 17*a* is formed under the wire-hanging boards 17 and extends above the upper part of the above-mentioned lower frame 14. Moreover, a holder 20 for retaining the electric wire-connecting part WE of the bundles of electric wires WB (illustrated for simplicity as single wires in FIG. 3) constituting the wire assembly, is mounted on the upper part of the lower frame 14. On the other hand, a receptacle 30 accommodating the bundles of electric wires WB is fixed on the back of the above-mentioned wire-hanging board 17. The bundles of electric wires WB stored in the receptacle 30 are subsequently folded over and hung on a hanging part 40 mounted on the upper end of the wire-hanging board 17. Further, the electric wire-connecting parts WE hang down toward the holder 20 in a condition in which the electric wires are sandwiched by an electric wire-sandwiching system 50 positioned in front of the wire-hanging board 17. Moreover, the respective electric wire-connecting parts WE are retained for mounting and removal by the holder 20.

Figure 4:
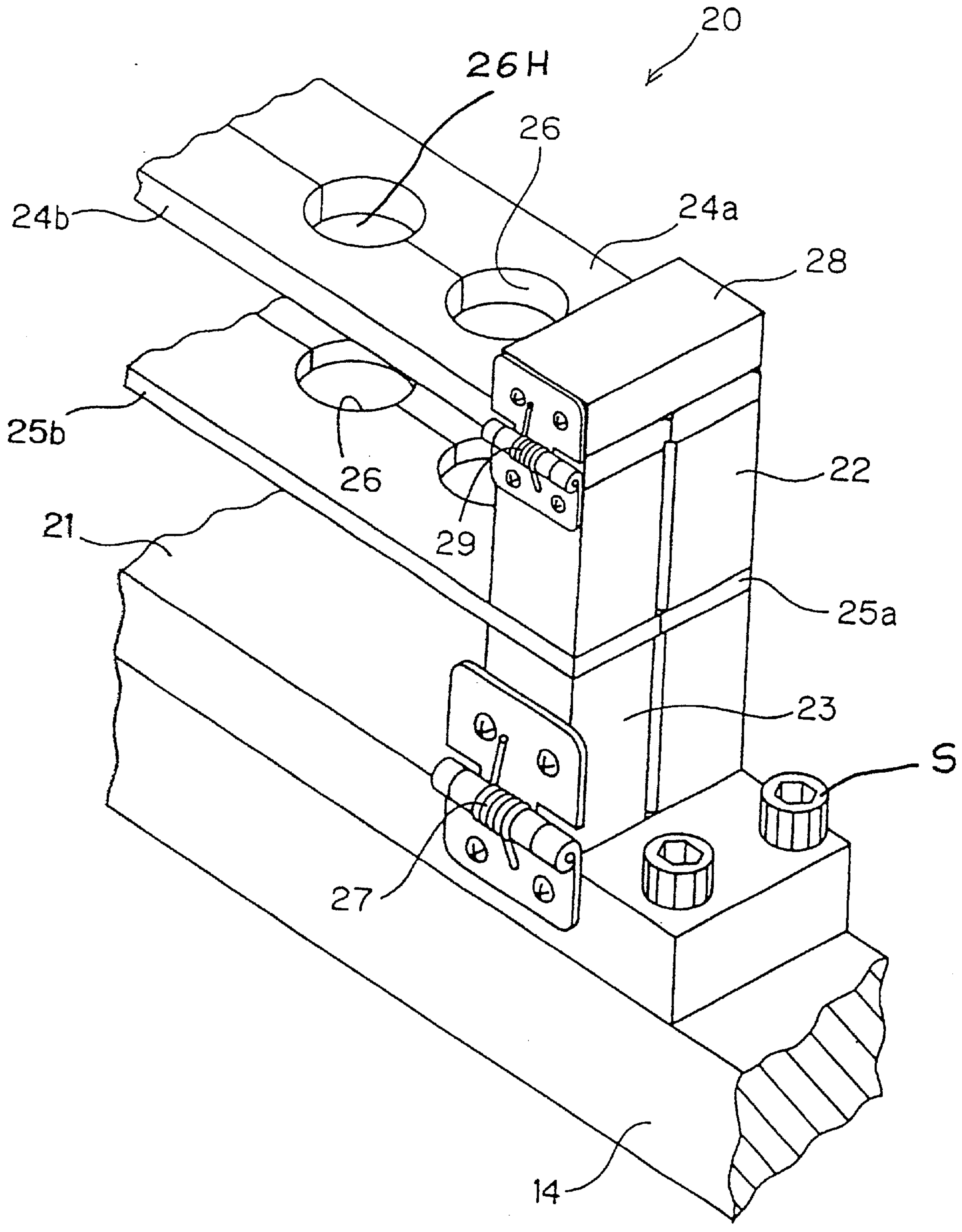
FIG. 4 is an enlarged partial perspective view showing a portion of a holder of the transport carrier of FIG. 3.
Figure 5:
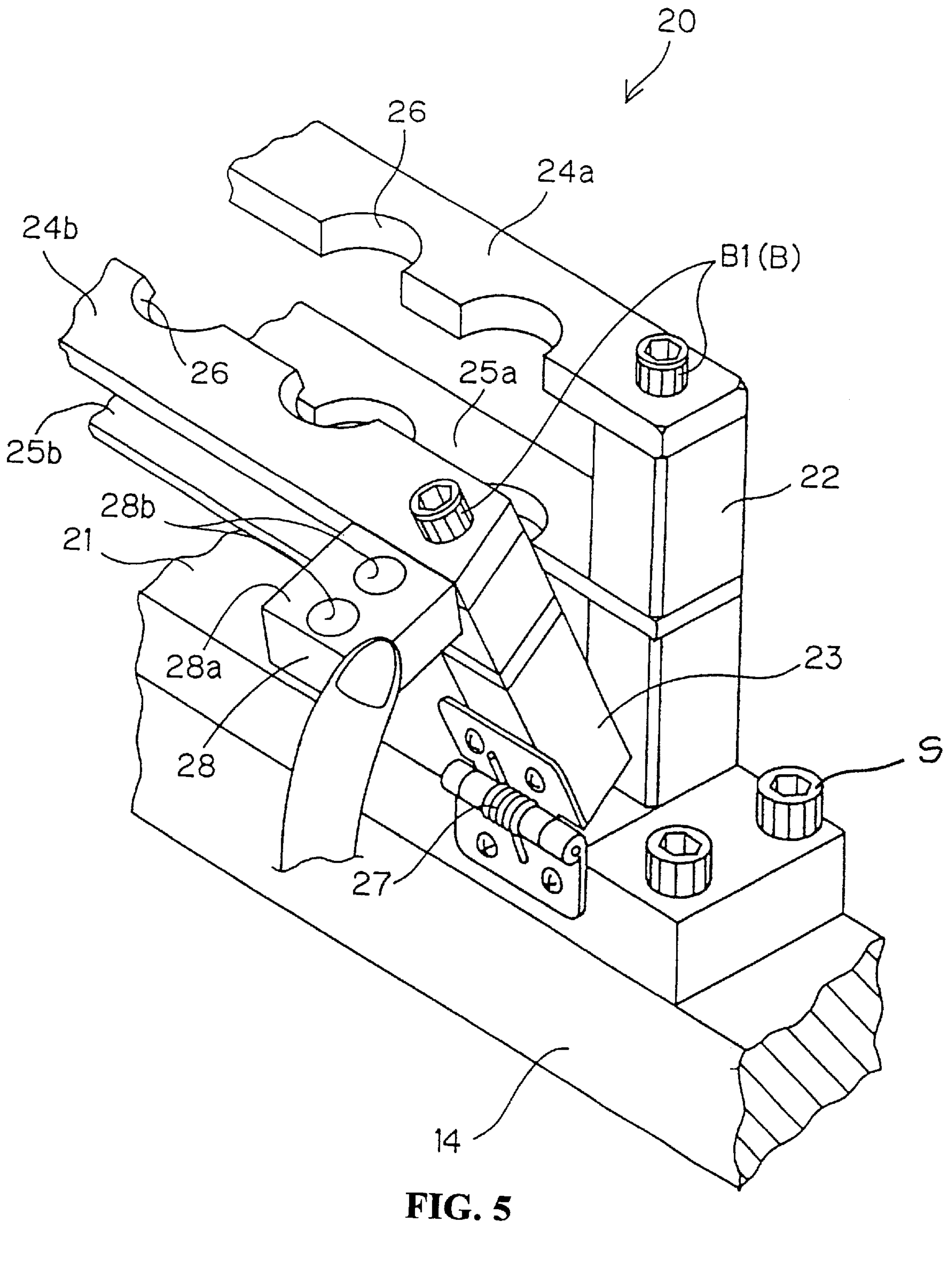
FIG. 5 is an enlarged partial perspective view showing the operation of the holder depicted in FIG. 3.

FIGS. 4 and 5 are enlarged partial perspective views showing details of the holder 20 adopted in the modes of operation of FIG. 3. Referring to these figures, the holder 20 extends along the length direction of the lower frame 14 (refer to FIG. 3), and includes a base frame 21 attached with screws S to the lower frame 14, a pair of the fixed pillars 22 are mounted upright on opposite ends of the base frame 21, and a pair of pivotal pillars 23 are aligned in a width direction of the base frame 21 to abut against the respective fixed pillars 22. The respective pillars 22 and 23 can be formed from any suitable material, preferably of stainless steel, and are divided into upper and lower double steps, which support the supporting boards 24*a*, 24*b*, 25*a* and 25*b*, respectively, at an upper step part and at a middle step part. The respective supporting boards 24*a*, 24*b*, 25*a* and 25*b* are provided with the semicircular recesses 26 on confronting side edges thereof. The recesses 26 are spaced along opposite sides at the same position along the length direction, and mutually partition circular insertion holes 26H in a retention condition as shown in FIG. 4 and are configured to retain the electric wire-connecting parts WE. The respective supporting boards 24*a,* 24*b,* 25*a* and 25*b* are formed of any suitable material having a high heat resistance, for example stainless steel or the like, in a similar manner to the base frame 21 and the pillars 23 and 23. Furthermore, as described later, when the electric wire-connecting parts WE are heated, the supporting boards function as reflectors to reflect heat from a heat source such as a heater H and accumulate heat from the surroundings.

Additionally, in order to open and close the respective supporting boards 24*a,* 24*b,* 25*a* and 25*b,* the above-mentioned pivotal pillars 23 are connected with the base frame 21 by spring hinges 27 and are biased to a normal position in which they extend perpendicularly and abut the fixed pillars 22 in a closed condition by the force of the spring hinges 27, as shown in FIG. 4. Thus, the electric wire-connecting parts WE can be retained by closing the respective supporting boards 24*a,* 24*b,* 24*a* and 25*b.* On the other hand, the respective supporting boards 24*a,* 24*b,* 25*a* and 25*b* are opened by rotating the pivotal pillars 23 against the bias of the spring hinges 27, and the electric wire-connecting parts WE supported thereby are thus released.

Furthermore, in the mode of operation illustrated, locking covers 28 are provided to prevent the pivotal pillars 23 from unintentionally opening. The locking covers 28 can change position between two conditions; a fixed condition in which the covers 28 are positioned on the top of both the pillars 22 and 23, as shown in FIG. 4, by being connected with the pivotal pillars 23 by spring hinges 29 in a similar manner to the spring hinges 27, and a released condition in which the pivotal pillars 23 are permitted to pivot by pivoting the covers 28 away from the top of both the pillars 22 and 23 as shown in FIG. 5. In the fixed condition, the locking covers 28 lock the pivotal pillars 23 on the fixed pillars 22, and a structure in which the locking covers 28 are hooked on the undulation part of the fixed pillars 22 is obtained.

Specifically, as shown in FIG. 5, a pair of the holes 28*b* having a bottom are provided on the face 28*a* of the locking covers 28 which contacts the respective pillars 22 and 23. The holes 28*b* are configured to hook on the heads B1 of the bolts B which are used to assemble the respective pillars 22 and 23 together with the corresponding supporting boards 24*a,* 24*b,* 25*a* and 25*b.* During the fixed condition, the locking covers 28 are automatically hooked on the bolt head parts B1 by the biasing force of the spring hinges 29, and any unintentional pivoting of the pivotal pillars 23 is prevented.

Referring to FIG. 3, the receptacle 30 of the transport carrier 10, which is made of any suitable material, for example, a sheet metal member or of a resin, accommodates the extra length part of the respective bundles of electric wires WB which are folded and hung on the wire-hanging board 17. Thus, the respective bundles of electric wires WB are designed to be protected.

Referring to FIGS. 1(A)–1(C), 2 and 3, in the above-mentioned electric wire removal process, the worker P hangs the respective bundles of electric wires WB on the electric wire-hanging part 40 illustrated and accommodates the extra length part in the above-mentioned receptacle 30. Then, the end parts of the respective bundles of electric wires WB are in a condition in which they are positioned relative to the holder 20. Moreover, when the electric wire-connecting parts WE are covered with the cover CV, they are inserted in the insertion holes 26H formed by recesses 26 of the holder 20 and retained therein.

Figure 6:
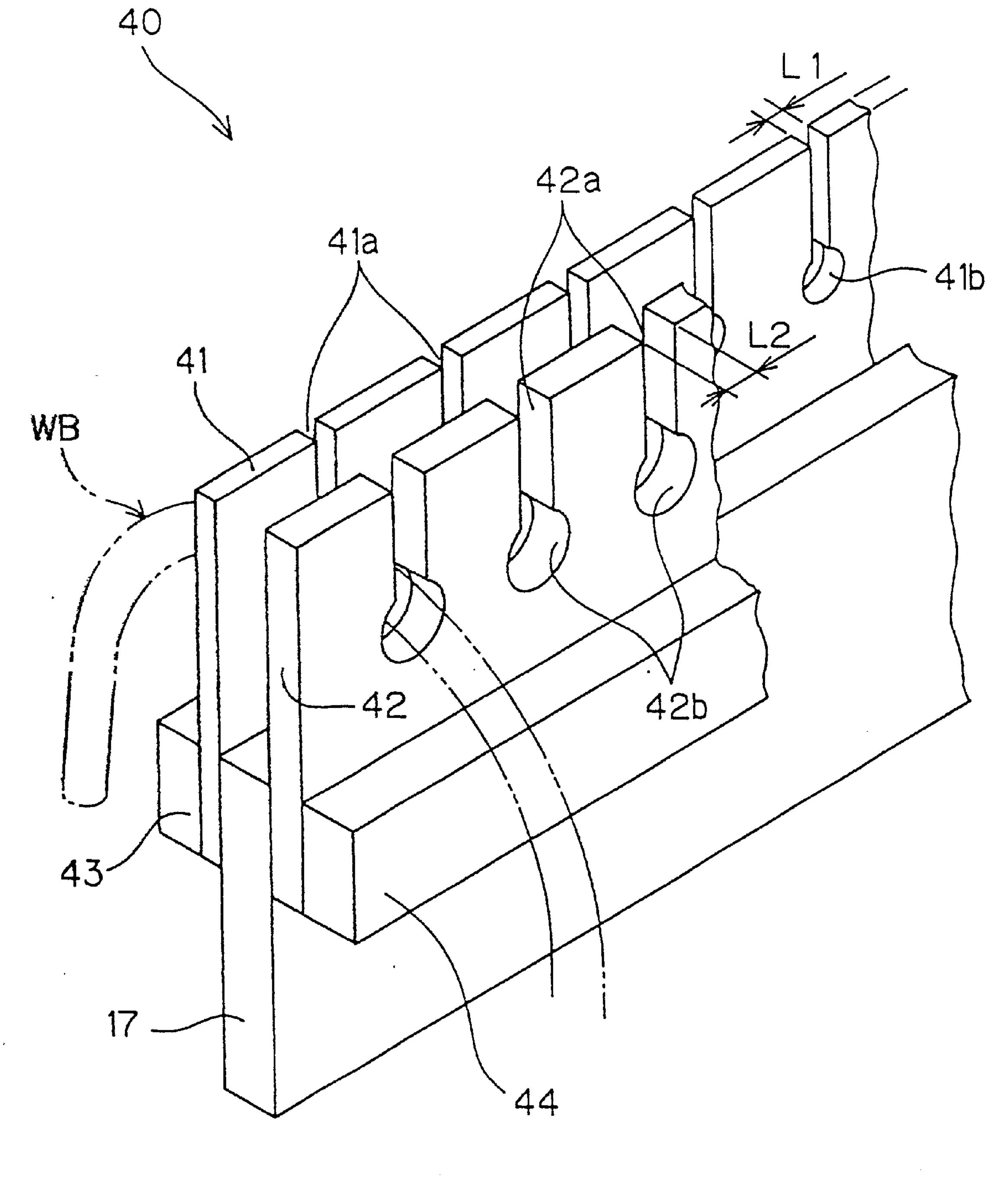
FIG. 6 is an enlarged partial rear perspective view showing the principal part of the electric wire-hanging part of one embodiment of the present invention.

Referring to FIGS. 3 and 6, the electric wire-hanging part 40 installed on the upper part of the wire-hanging board 17 is illustrated. FIG. 6 is an enlarged perspective view showing the principal part from the rear side of the electric wire-hanging part 40 which is important to the hooking procedure of the transport carrier 10 related to one mode of operation of the present invention.

As shown in FIGS. 3 and 6, the electric wire-hanging part 40 in the example illustrated is fixed with screws (not shown) in a condition in which a clamp board 41 installed on the front side of the wire-hanging board 17 and a guide board 42 installed on the back side are respectively reinforced with reinforced members 43 and 44. The opening width L1 of respective slits 41*a* formed on the clamp board 41 is narrower than the opening width L2 of respective slits 42*a* formed on the guide board 42. Therefore, the respective slits 41*a* form clamping slits which clamp the position at which the electric wire-connecting parts WE of the bundles of electric wires EB are formed, and the respective slits 42*a* of the guide board 42 constitute guide slits provided at the opposite side to the electric wire-connecting parts WE of the guide slits 41*a.* Due to the adoption of the construction in FIG. 6, when the electric wire-connecting parts WE are hung on the wire-hanging board 17, first of all, the positioning is roughly determined by introducing the bundles of electric wires WB into the guide slits 42*a,* then the bundles of electric wires WB can be relatively easily clamped in the expanded openings 41*b* and 42*b,* which are formed at the bottom of the respective slits 41*a* and 42*a,* by introducing into the clamping slits 41*a.* On the other hand, when the bundles of electric wires WB are removed, the work can be terminated merely by holding the bundles of electric wires WB and removing them from both of the slits 41*a* and 42*a.*

Additionally, the board 41, 42 may be formed from a resilient material, for example by an elastomeric material, such as rubber. When two rubber boards as shown in FIGS. 3 and 6 are adopted as the elastomer forming the above-mentioned respective slits 41*a* and 42*a,* many slits are relatively easily formed and the positioning during assembly becomes easy. Further, even when the numbers of the electric wires W forming the bundles of electric wires WB differ, the flexibility of the material forming the boards will accomodate the different diameters of the bundles of electric wires WB. In addition, the respective slits 41*a* and 42*a* may be formed by providing multiple pieces comprising a set of two and providing the sets at intervals.

Figure 7:
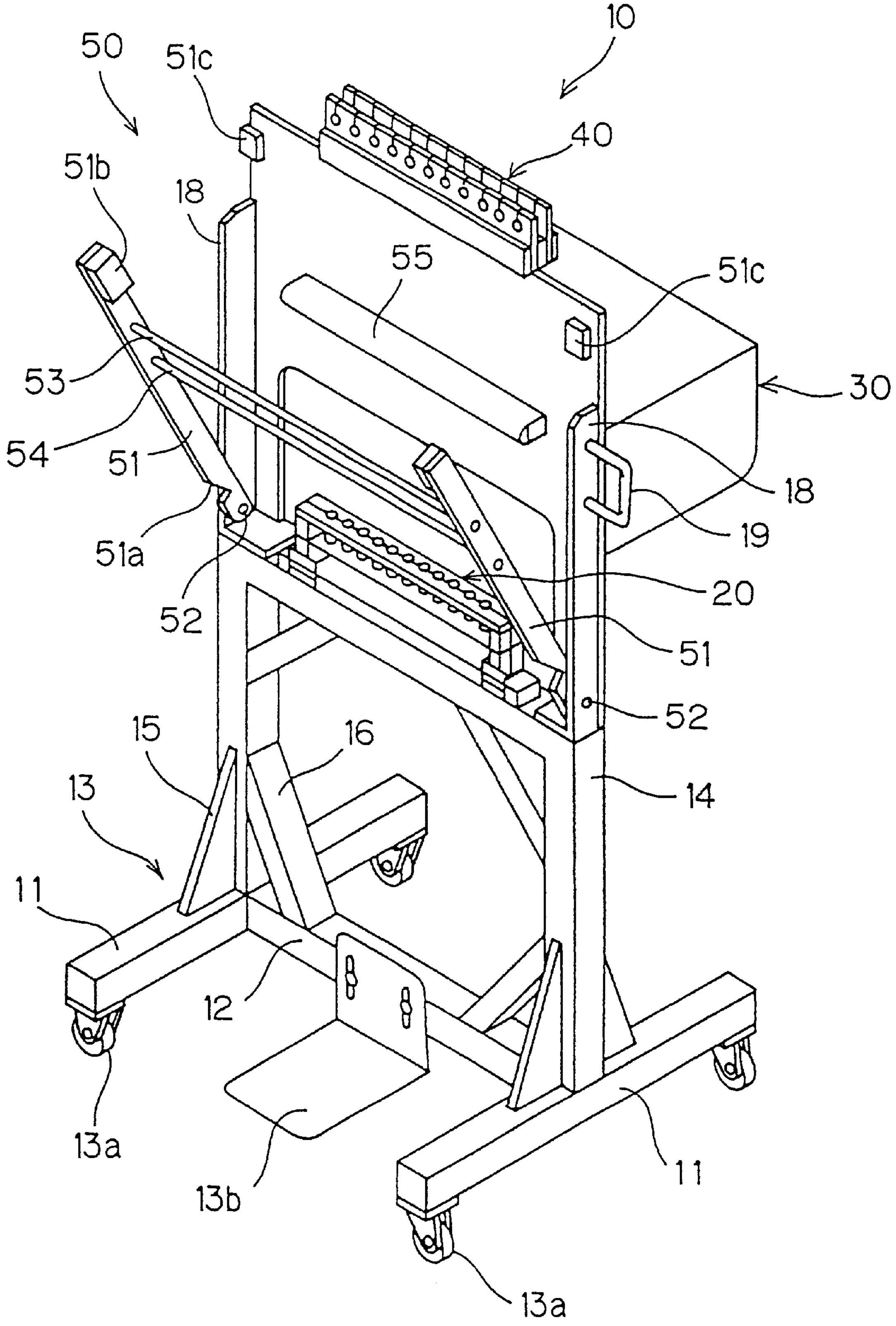
FIG. 7 is a perspective view of the electric wire carrier showing the electric wire-sandwiching system related to the mode of operation of FIG. 1.
Figure 8:
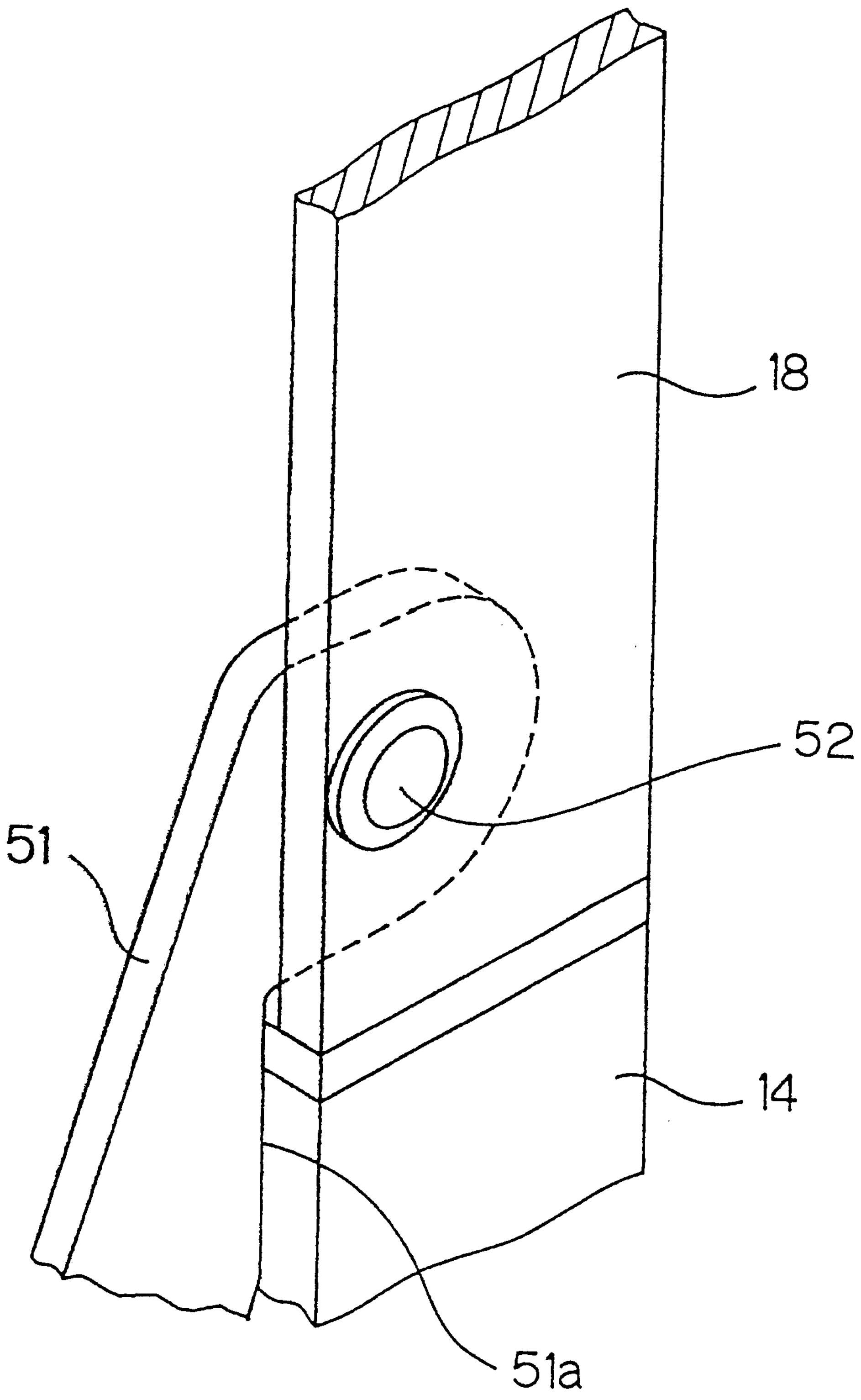
FIG. 8 is an enlarged perspective view showing a portion of the electric wire-sandwiching system of FIG. 7.
Figure 9:
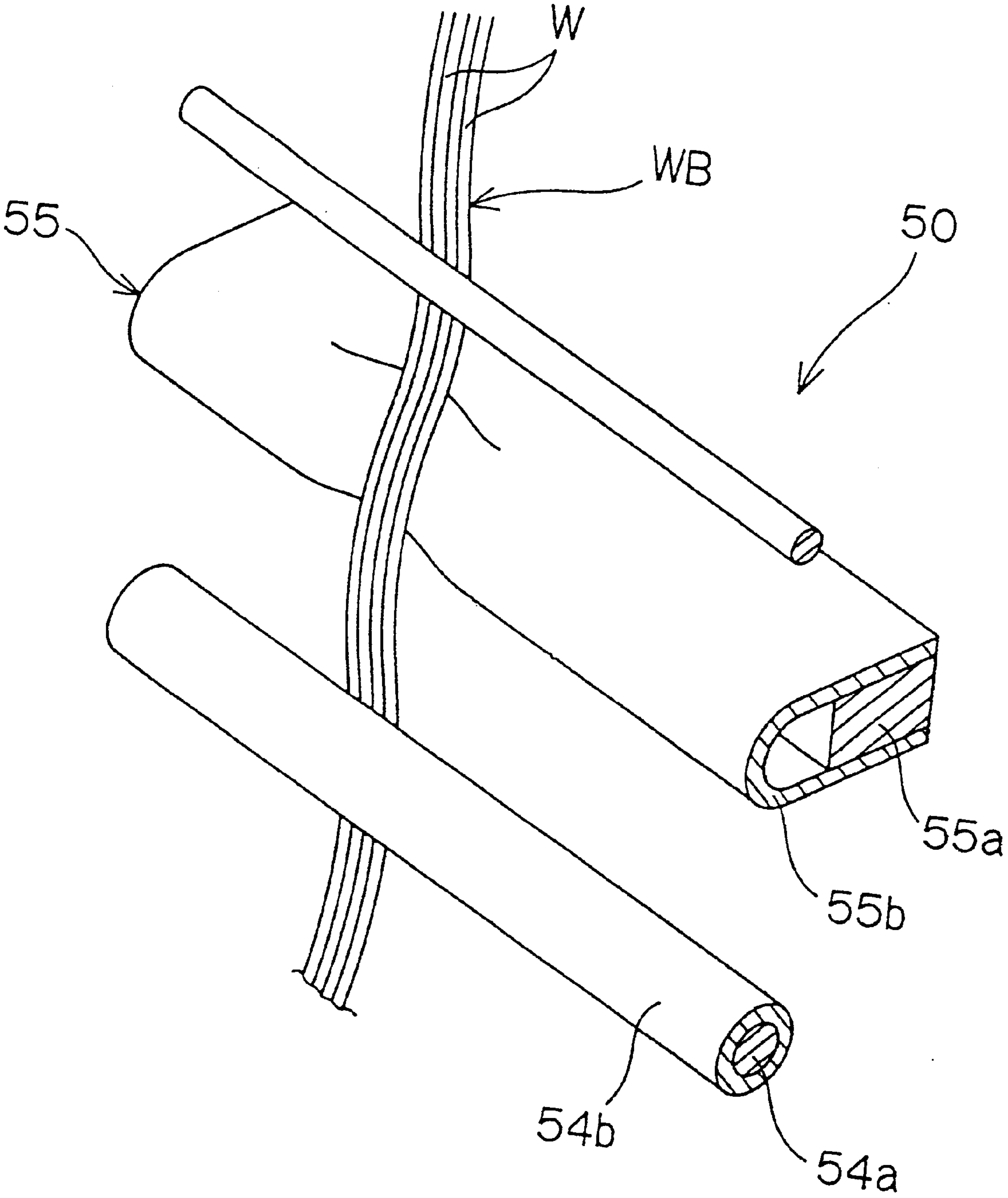
FIG. 9 is an enlarged perspective view showing further details of the electric wire-sandwiching system.

Referring to FIGS. 3, 7, 8 and 9, the electric wire-sandwiching system 50 is illustrated. FIG. 7 is a perspective view of the transport carrier 10 showing the construction of the electric wire-sandwiching system 50 relating to the mode of operation in FIG. 1, and FIGS. 8 and 9 are perspective views showing details of the electric wire-sandwiching system 50.

First, referring to FIGS. 3 and 7, the electric wire-sandwiching system 50 in the mode of operation shown in FIG. 3 is provided with a pair of the pivoting arms 51 arranged inside the respective supporting frames 18 installed on opposite sides of the wire-hanging board 17. Pivot pins 52 connect both of the pivoting arms 51 on the base parts of the corresponding supporting frames 18 for pivotal movement, and a pair of pressure bars 53 and 54 are connected between both of the rotational arms 51.

Both of the pivoting arms 51 are formed of any suitable material, and preferably are made of a metal. The pivoting arms 21 can be moved between a stopping position, which extends approximately parallel to the wire-hanging board 17, by pivoting free ends toward the wire-hanging board 17 by the above-mentioned pivoting 52, and a release position in which the free end of the pivoting arms 21 pivot downwardly as shown in FIG. 7. Moreover, during the release position, the respective bundles of electric wires WB can be collectively positioned between the pair of pressure bars 53, 54 and a fixed rib (described later) by hanging the bundles of electric wires WB on the electric wires-hanging part 40, hanging down the side to which the electric wire-connecting parts WE are formed, and moving the pivoting arms 51 to the stopping position at the time of the completion of hanging the bundles of electric wires WB. Further, the collective release of the respective bundles of electric wires WB becomes possible by moving the pivoting arms 51 to the release position in a stopped condition.

In the mode of operation illustrated, notches 51*a* for hooking are formed adjacent the base of each respective pivoting arm 51, as shown in FIGS. 7 and 8. Further, iron pieces 51*b* are fixed on the free end of each respective pivoting arm 51, and magnets 51*c* for attracting the iron pieces 51*b* of the respective pivoting arms 51 in the stopping posture are fixed on the wire-hanging board 17 so that the respective pivoting arms 51 in the stopping position and do not unintentionally change to the release position.

Referring to FIGS. 3, 7 and 9, a pair of the pressure bars 53 and 54 stop the bundles of electric wires WB which hang down from the above-mentioned electric wires-hanging part 40 in cooperation with a fixed rib 55 fixed in front of the wire-hanging board 17, and are used for regulating at least the behavior of the electric wire-connecting part side of the bundles hung on the wire-hanging board 17. In order to provide such action, the respective pressure bars 53 and 54 extend horizontally at a position adjacent to the wire-hanging board 17 so as to press against all of the bundles of electric wires WB which hang down from the electric wires-hanging part 40. On the other hand, the fixed rib 55 which is formed on the wire-hanging board 17 enters between the pressure bars 53 and 54 in a stopping position of the pivoting arms 51, is positioned at a height between, and protrudes slightly more forwardly than both of the pressuring bars 53 and 54.

The fixed rib 55 includes a rectangular member 55*a* fixed on the wire-hanging board 17 and a resilient member 55*b*, formed from any suitable material such as rubber, is fixed in a condition in which the outer peripheral surface of the rectangular member 55*a* is covered. The portion of the resilient member 55*b* protrudes in front of the wire-hanging board 17 in a curved condition, and the fixed rib 55 enters between both of the pressure bars 53 and 54. Accordingly, as shown in FIG. 9, the resilient member 55*b* receives the bundles of electric wires WB in an elastically depressed condition, and is designed to sandwich the bundles of electric wires WB with a fixed sandwiching force without damage. Further, from the viewpoint of protecting the bundles of electric wires WB, the pressure bar 54 arranged to the free end side of the bundles of electric wires WB has a construction in which the outer periphery of the core bar 54*a* is covered with an elastomeric tube 54*b*, formed for example, from rubber.

Figure 10:
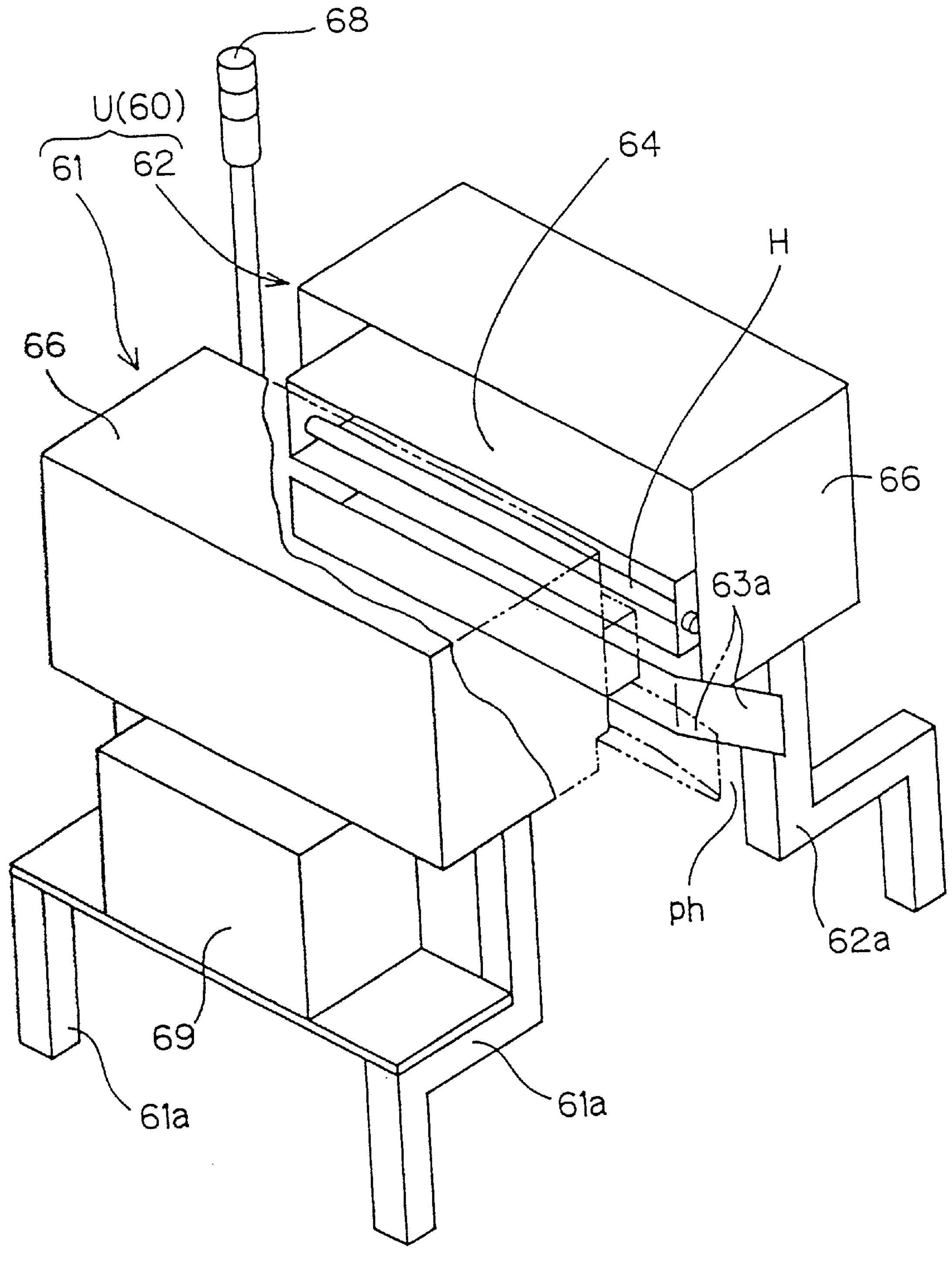
FIG. 10 is a partially broken-away perspective view showing a heating device related to the mode of operation of FIG. 2.

Next, a heating device 60 arranged at the station S4 will be described with reference to FIGS. 10–13. FIG. 10 is perspective view, partially broken away, showing the rough construction of the heating device 60 related to the mode of operation in FIG. 2, FIG. 11 is a plan view of the heating device 60, and FIG. 12 is a perspective view showing a use condition of the heating device 60 in FIG. 11.

First, referring to FIG. 10, the heating device 60 is formed from two units 61 and 62 as one set and constitutes the heating unit U, and a plurality of heating units U are provided in sequence. The units 61 and 62 confront each other at a fixed interval and therefore form an entry path ph by which the above-mentioned transport unit 10 can be introduced between the units 61 and 62. The units 61 and 62 are to have an approximately rectangular shape in plan view and extend along the entry path ph.

The respective units 61 and 62 are provided with symmetrical leg members 61*a* and 62*a* which are perpendicularly bent in an approximate crank shape so that sufficient space is provided for the transport unit 10 to be inserted and removed within the above-mentioned entry path ph. The pair of leg parts 61*a* and 62*a* is connected together as a unit by connecting the down-flow end side in the introduction direction D (note FIG. 11) to the entry path ph, and supports a generally rectangular table frame 63 forming a plane and partitioning the entry path ph as shown in FIG. 11. In the mode of operation shown in FIG. 11, a pair of the guide frames 63*a* in which the opening side of the entry path ph is opened in a generally inverted V-shape are fixed on the table frame 63 for ease of introduction of the transport carrier to the entry path ph.

Figure 11:
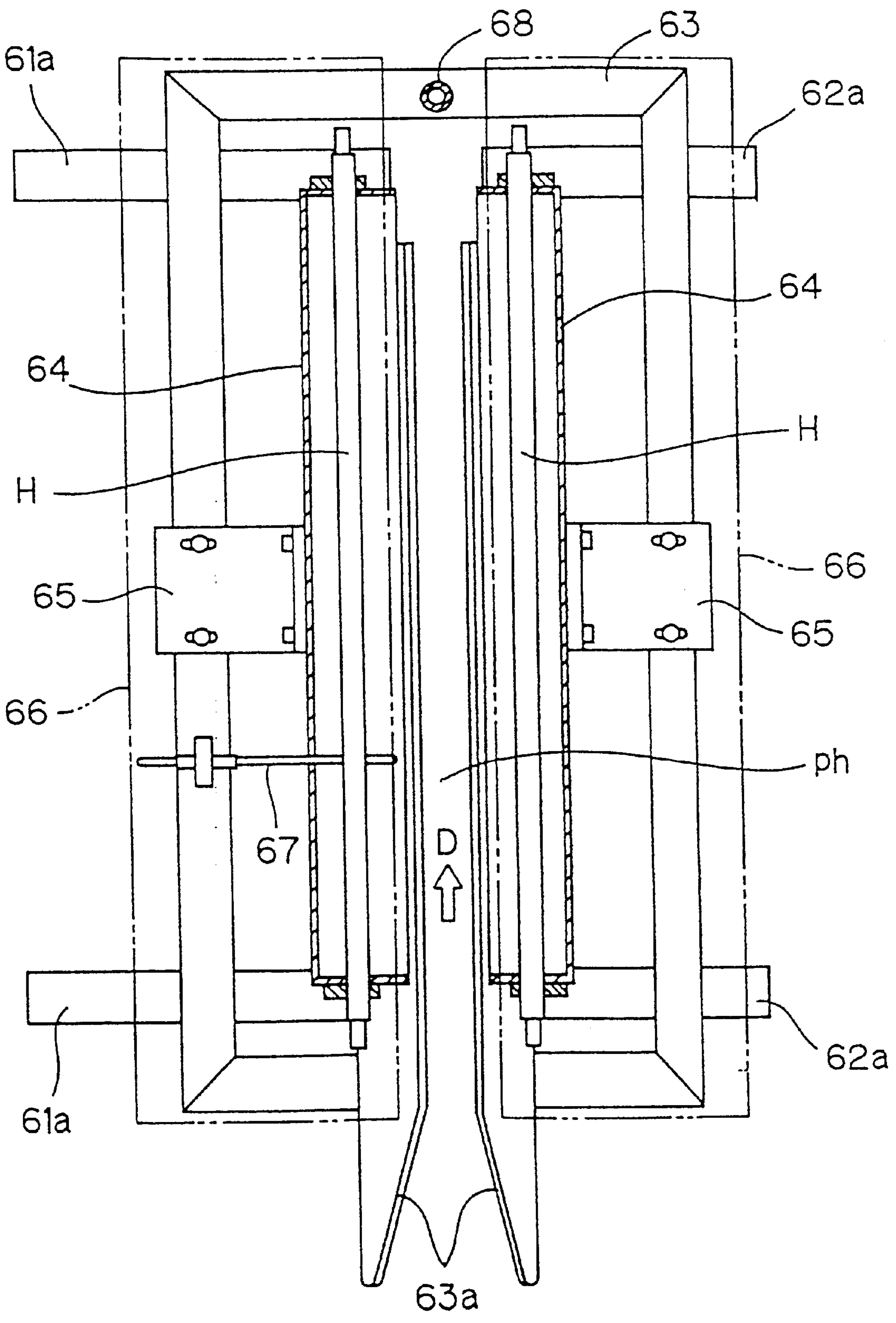
FIG. 11 is a schematic plan view of the heating device of FIG. 10.
Figure 12:
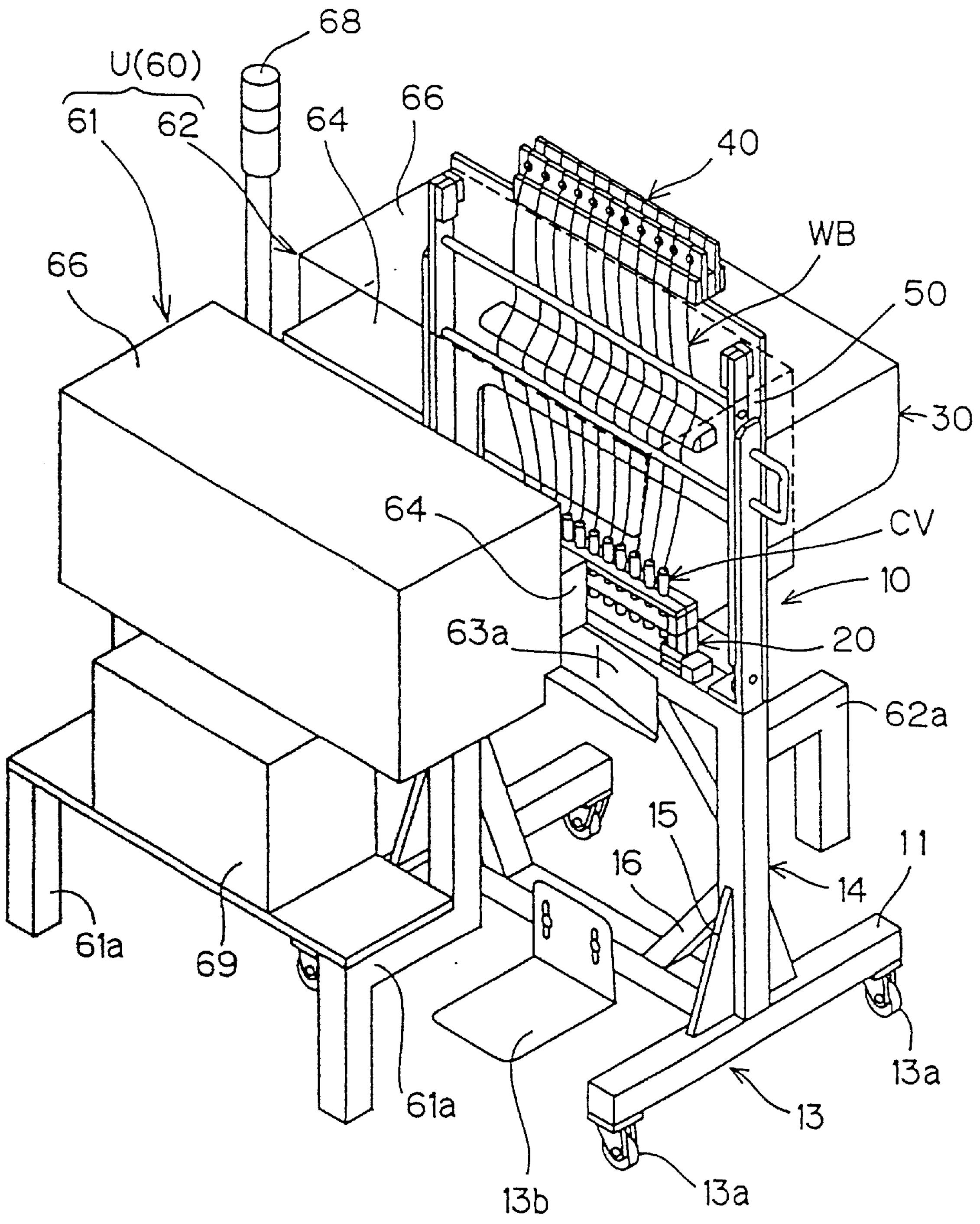
FIG. 12 is a perspective view showing the use of the heating device of FIG. 11.

Referring to FIG. 11, a pair of facing heat covers 64 are provided on opposite side of the entry path and are fixed on table frame 63 through a stay 65. The respective heat covers 64 are covering members formed of any suitable material, preferably of stainless steel, and have a cross section formed generally in a U-shape. The heat covers 64 accommodate in parallel sheath heaters H inside, and the respective sheath heaters H face the entry path ph as shown in FIGS. 10 and 11. Further, the inner surface of the heat covers 64 is designed to act as a reflection board which can reflect the heat of the sheath heaters H toward the entry path ph. The outside of the heat covers 64 is covered with the rectangular safety cover 66, which forms an air jacket between heat cover 64 the safety cover 66. Furthermore, as shown in FIG. 11, a thermo-couple 67 is provided to monitor the condition of the heaters H.

Additionally, indicator and alarm lamps 68 are provided for the respective heating units U, limit switches (not illustrated) are provided for detecting the existence of the transport carrier 10 introduced in the entry path ph, and controllers 69 including the limit switches as a detection procedure are also provided. The controllers 69, which include a sequencer and other circuits, control the sheath heaters H. In addition, lamps 68 indicate detection of the transport carrier 10 by the limit switches, and the time at which the transport carrier 10 was introduced and heated is adapted to be measured and displayed by the controller and any conventional display device.

Moreover, as shown in FIG. 12, the bundles of electric wires WB face the sheath heaters H of the heating units U in a condition in which both the front and back sides thereof are heated by introducing the transport carrier 10 supporting the bundles of electric wires WB into the entry path ph of the respective heating units U. The transport carrier 10 is designed to position the above-mentioned electric wire-connecting parts WE at a fixed height relative to the sheath heaters H which are the heat source of the heating units U (the heating device 60).

Figure 13:
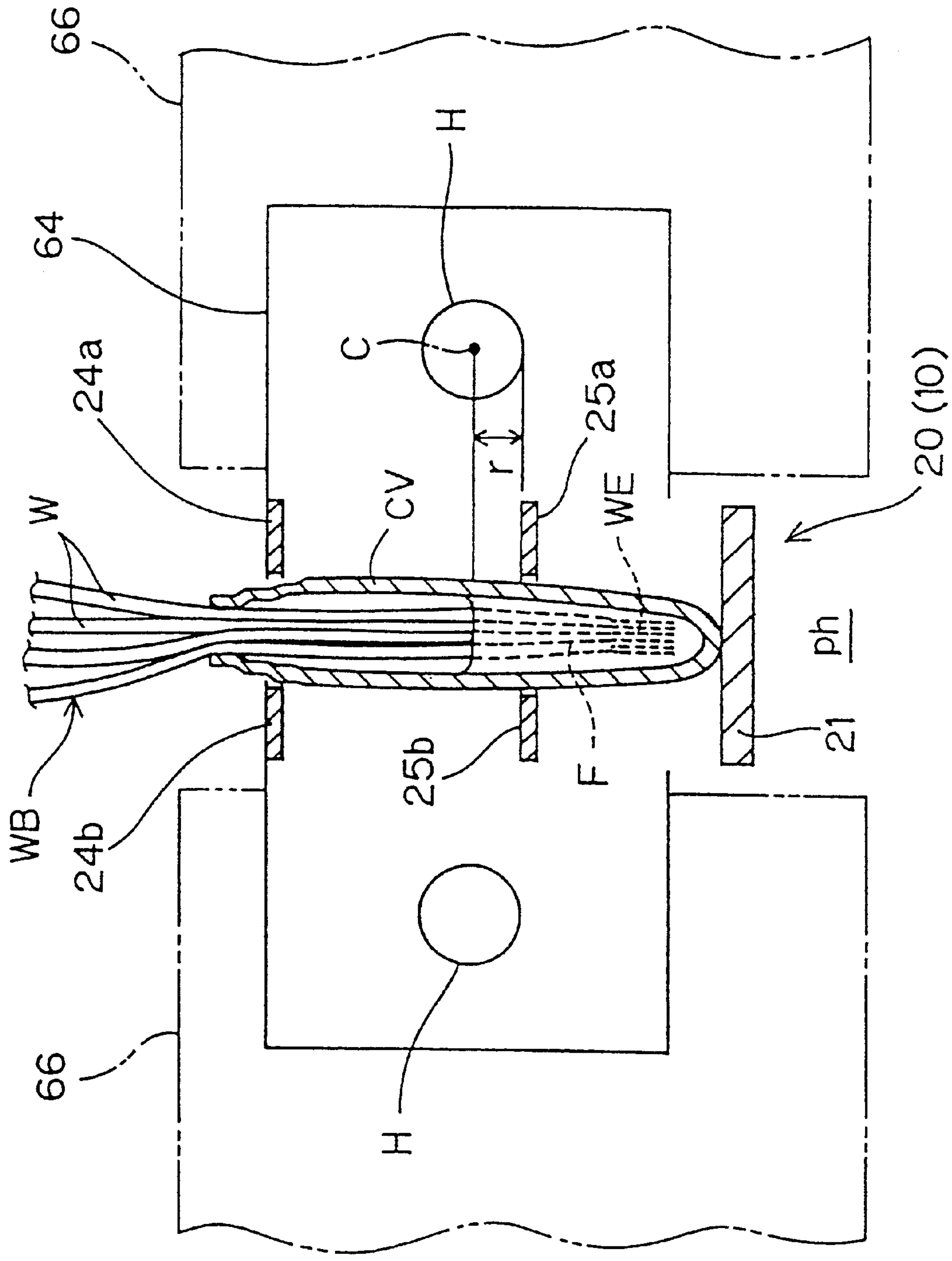
FIG. 13 is a schematic sectional view generally showing the positioning of a sheath heater of the heating device.

FIG. 13 is a schematic sectional view generally showing the positioning of the sheath heaters H of the heating device 60. Referring to the same drawing, in the mode of operation illustrated, the sheath heaters H are arranged between the upper supporting boards 24*a* and 24*b* provided on the holder 20 of the transport carrier 10 and the lower supporting boards 25*a* and 25*b*. Accordingly, the filler F (refer to FIG. 1) injected into the cover CV is filled to a level approximately at a horizontal plane which passes through the center of the sheath heaters H as shown in FIG. 13.

Moreover, when the center of the sheath heater H is defined as C and its radius is defined as r, the center C is at about the same level as the upper level of the filler F on a horizontal plane, and a height from the upper face of the lower supporting boards 25*a* and 25*b* to the level of the filler F is configured to be about the same dimension as the above-mentioned radius r. Thus, since the heat of the sheath heaters H is radiated between the upper supporting boards 24*a* and 24*b* and the lower supporting boards 25*a* and 25*b* and is reflected between the upper supporting boards 24*a* and 24*b* and the lower supporting boards 25*a* and 25*b*, the heat accumulates around the fill level. Further, during a process of heating, heat from the sheath heathers H is efficiently radiated between the upper supporting boards 24*a* and 24*b* and the lower supporting boards 25*a* and 25*b*, and the upper level of the filler positioned between them is cured. Additionally, as the lower supporting boards 25*a* and 25*b* are lower than the level of filler F by the radius of the sheath heaters H, between a pair of the supporting boards 24*a* and 24*b* and a pair of the supporting boards 25*a* and 25*b*, the volume of the filler F (heat capacity) arranged between respective supporting boards 24*a*, 24*b*, 25*a* and 25*b* becomes the least condition within a region in which temperature around the fill level becomes rapidly high (for example, 80° C.) and the filler F is cured form the upper level during a short period of time (for example, 5 minutes).

Thus, in the above-mentioned mode of operation, as the electric wire removal process, the electric wire-connecting process, and the covering process can be consistently carried out by the transport procedure, it becomes unnecessary to frequently carry out the work of mounting and removal. Further, as the covering work is carried out on the transport procedure and the level of the filler F is positioned against the heat source by the transport procedure in the covering process, the filler is cured, first of all, from the opening side of the cover CV which is formed in a cap shape having a bottom.

Further, in the process of heating the filler F of the cover CV, as a pair of the supporting boards 24*a*, 24*b*, 25*a* and 25*b*, which confront upward and downward the level of the filler F, are positioned against the sheath heaters H in a condition in which the cover CV is covered, heat radiated from the sheath heaters H is accumulated between a pair of the supporting boards 24*a*, 24*b*, 25*a* and 25*b*, and the temperature around the fill level becomes rapidly high and the filler F is cured from the level.

As illustrated above, according to the above-mentioned mode of operation, as the electric wire removal process, the electric wire-connecting process, and the covering process can be consistently carried out on the transport carrier 10, it becomes unnecessary to frequently carry out the work of mounting and removal, and therefore workability is extremely good and it is possible to further constitute a line suitable foe use with automation.

Further, in the covering process, as the filler is cured, first of all, from the opening side of the cover CV which is formed in a cap shape having a bottom, the filler F is cured in the curing process during a short period of time, and treatment of the bundles of electric wires is performed as easily as possible.

Accordingly, the results are that the treatment of the bundles of electric wires WB can be easily carried out and further, the covering process using the filler F is terminated during a short period of time and the treatment of the bundles of electric wires WB is easily accomplished.

Further, in the process of heating the filler F of the cover CV, as a pair of the supporting boards 24*a*, 24*b*, 25*a* and 25*b* which confront upwardly and downwardly the level of the filler F are positioned against the sheath heaters H in a condition in which the cover CV is covered, the curing of the filler F from the fill level is also accelerated from this point, and as a result, the filler F does not leak even in a condition in which the filler F is no completely cured and there is the advantage that the treatment of the bundles of electric wires WB become as easy as possible. Additionally, in the mode of operation illustrated, as the volume of the filler F (heat capacity) arranged between respective supporting boards 24*a*, 24*b*, 25*a* and 25*b* becomes the least condition within a region in which temperature subjected to heat-radiation is high, there is the advantage that the arrangement can be designed to greatly shorten the heating time.

In the mode of operation illustrated, it becomes possible to support the bundles of electric wires WB in a condition in which the fixed dimension from terminal part is maintained, independent of the length of the bundles of electric wires WB, by holding the bundles of electric wires WB by the electric wires-hanging part 40 or the electric wire sandwiching system 50 as a holding procedure in a condition in which the bundles of electric wires WB of the parts (hereinafter, referred to as "terminal parts") in which the bundles of electric wires EB are formed are positioned within the holder 20 in order to execute a plurality of processings on the bundles of electric wires WB at the time of hanging in the folded condition on the wire-hanging board 17. Further, as the bundles of electric wire-hanging part 40 constituting the holding procedure and the electric wire sandwiching system 50 are constituted in a condition in which the bundles of electric wires WB are able to be release, the fixation and removal of the bundles of electric wires WB can be easily carried out.

Additionally, in the mode of operation illustrated, when the bundles of electric wires WB are sandwiched in cooperation with the pressure bars 53 and 54 as a pressuring member, the bundles of electric wires WB can be elastically pressed against the fixed rib 55 and as a result, it becomes possible to obtain a large holding force without damage to the bundles of electric wires WB due to the elasticity of the resilient member 55*b* provided on the fixed rib 55. It is also possible to simultaneously release a plurality of the electric wire-connecting parts WE which are inserted and retained in the insertion holes 26H of the supporting boards 24*a*, 24*b*, 25*a* and 25*b* by opening the supporting boards 24*a*, 24*b*, 25*a* and 25*b* of the holder 20.

Thus, in the mode of operation described above, it becomes possible to support the bundles of electric wires WB in a condition in which the fixed dimension from terminal part is maintained, independent of the length of the bundles of electric wires WB at the time of hanging in the folded condition on the wire-hanging board 17 in order to execute a plurality of processings on the bundles of electric wires WB, and the mounting and removal of the bundles of electric wires WB can be easily carried out by the electric wire-hanging part 40 and the electric wire sandwiching system 50. Therefore, the remarkable effects that the workability is compatible with the maintenance of positioning accuracy, and a general purpose property can be further obtained, are exhibited.

Figure 14:
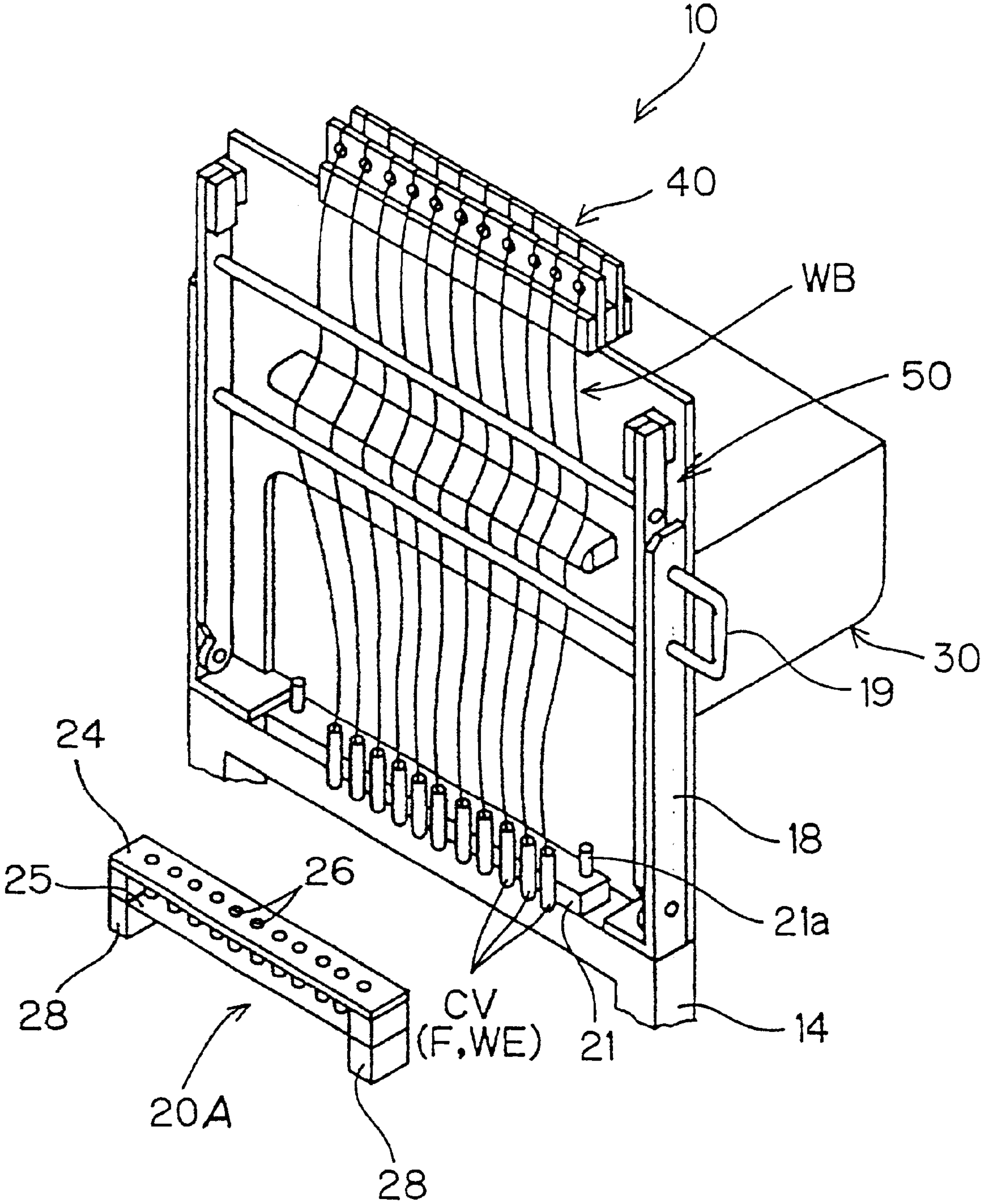
FIG. 14 is a perspective view showing the principal part of the transport carrier according to another mode of operation of the present invention.

The mode of operation described above exemplifies a preferable embodiment, and the present invention is not restricted to the mode of operation described above. FIG. 14 is a perspective view showing the principal part of the transport carrier according to another embodiment of the present invention. As shown in FIG. 14, a holder 20A applicable to the present invention, which include a pair of unitary supporting boards 24 and 25 may be intergatedly provided with a pair of the pillars 28 to form a pair of supporting boards in a set of two steps. Holder 20A may be connected by a pair of bosses 21*a* which extend upwardly from the base frame 21 to permit easy mounting and removing of holder 20A. Suitable blind apertures (not shown) are provided in the lower surfaces of pillars 28 for engagement with bosses 21*a*. In this case, it becomes possible to simultaneously release a plurality of the electric wire-connecting parts WE by removing the supporting boards 24 and 25 which support the electric wire-connecting parts WE, from the wire-hanging board 17.

Figure 15:
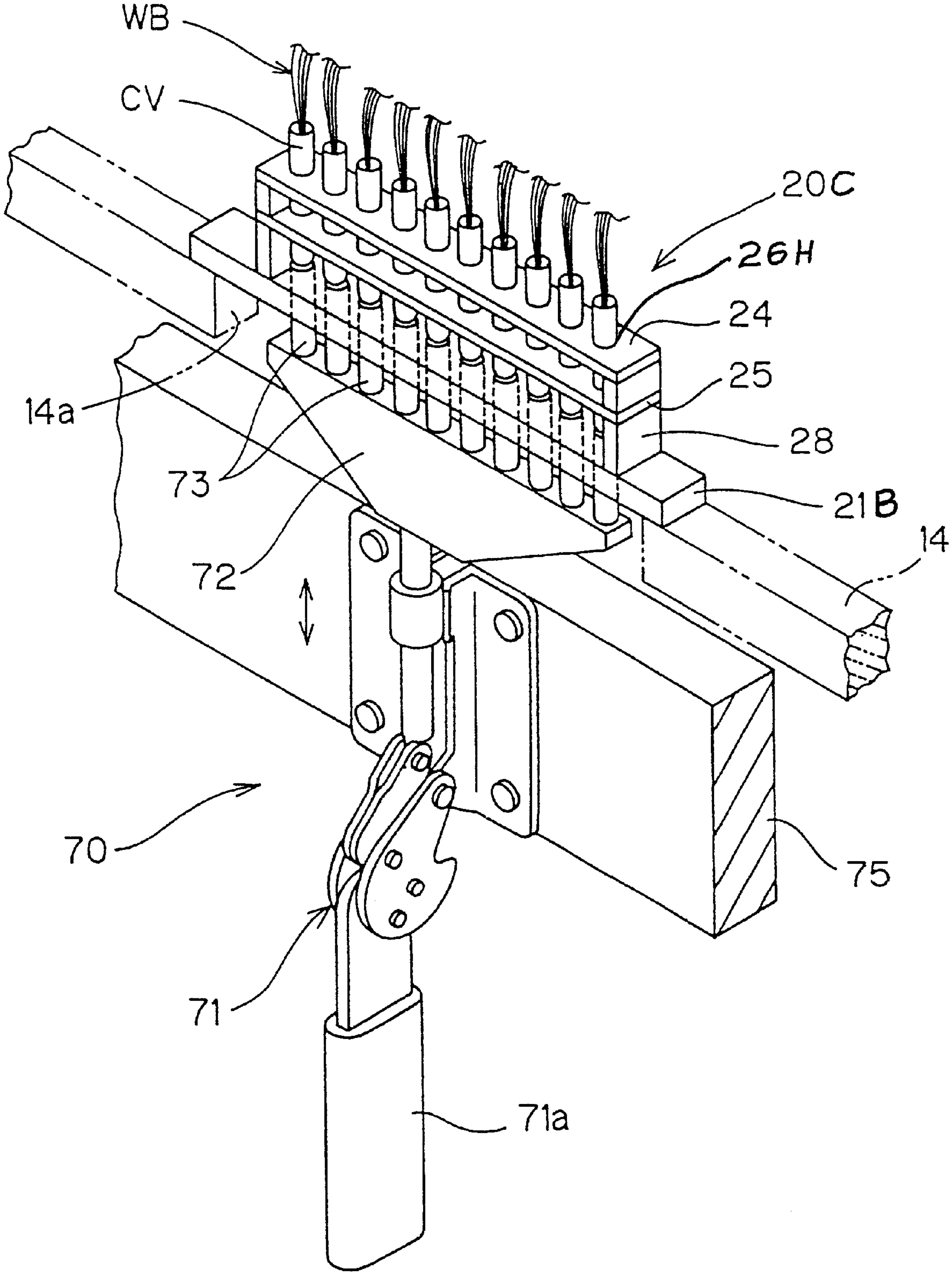
FIG. 15 is a perspective view showing the general construction of a holder according to a further embodiment of the present invention.
Figure 16:
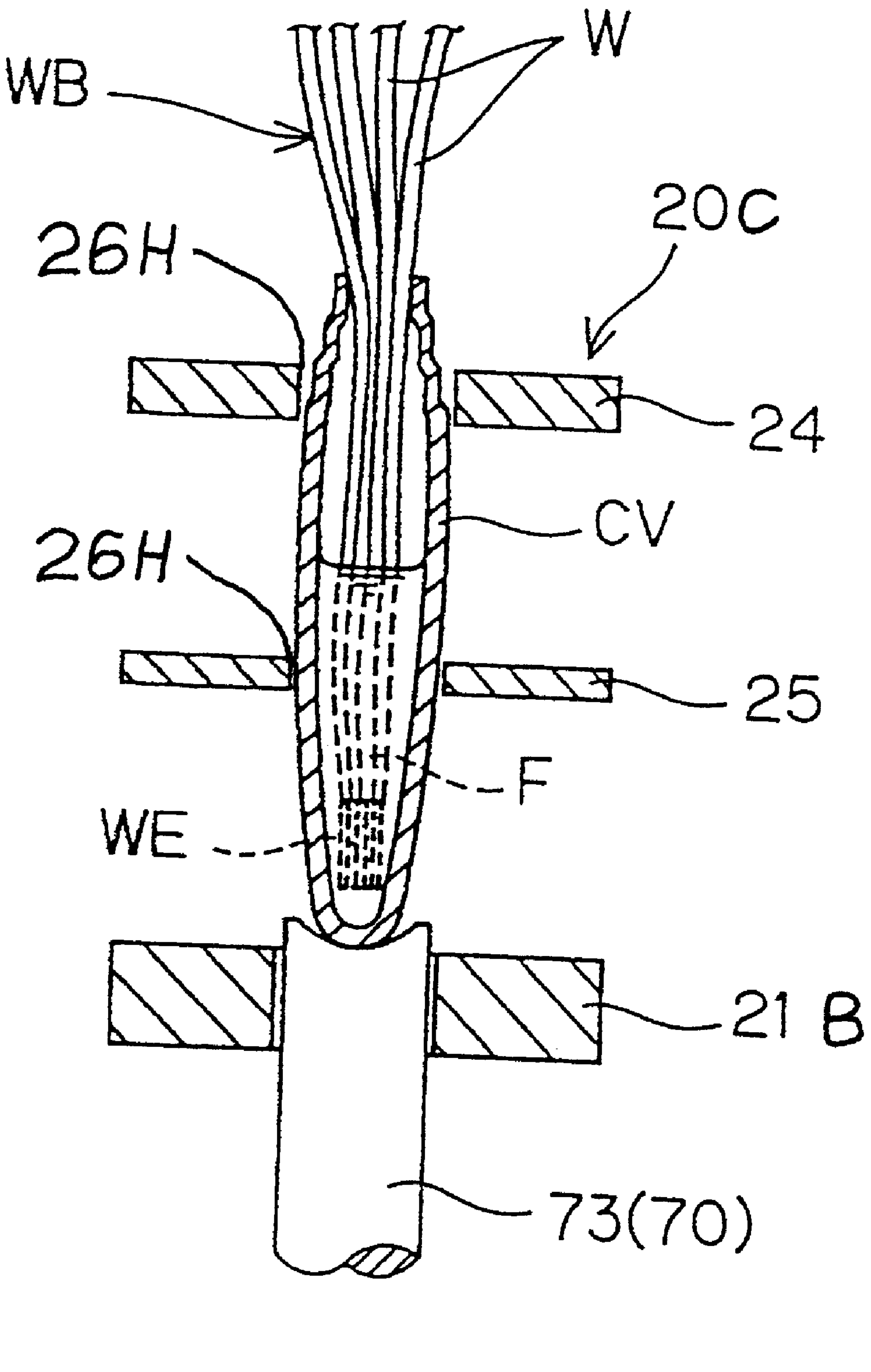
FIG. 16 is a partial sectional view showing a portion of the holder of the embodiment of FIG. 15.
Figure 17:
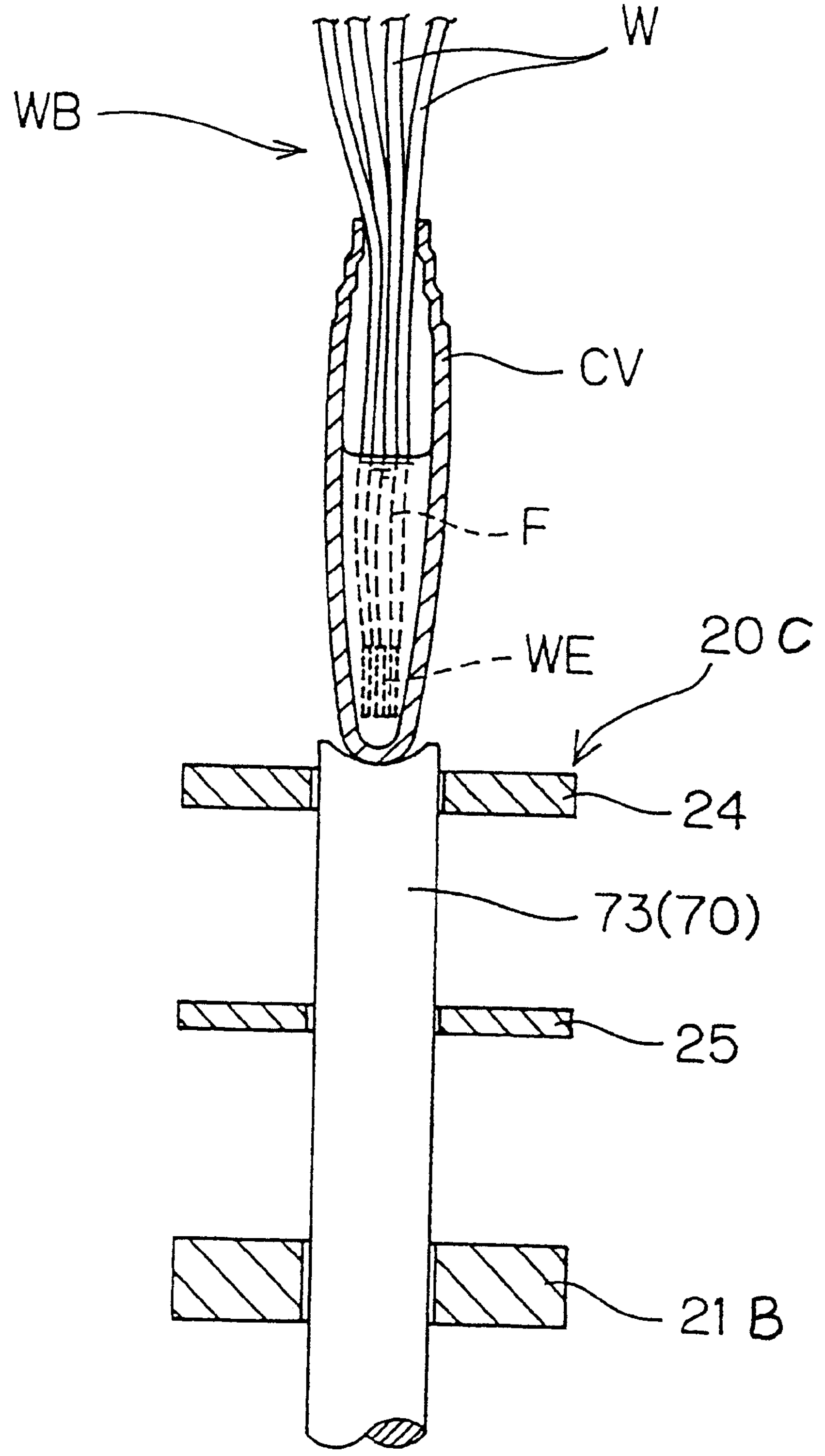
FIG. 17 is a partial sectional view showing the principal part of the holder related to the embodiment of FIG. 15.

FIG. 15 is a perspective view showing the general construction of the holder 20C according to still another mode of operation of the present invention. Further, FIG. 16 and FIG. 17 are partial sectional views showing the holder 20C according to the mode of operation of FIG. 15. In the construction shown in FIG. 15, a plurality of the insertion holes 26H are formed by a pair of supporting boards 24 and 25 provided in parallel on the frame body 14, and on the other hand, an elevator system 70 is provided. Elevator system 70 is constructed and arranged to simultaneously push out the respective end parts (the covers CV) introduced into the insertion holes 26.

The elevator system 70 is integrally provided with a well-known toggle handle 71 and with an elevator 72 driven upwardly and downwardly by the toggle handle 71. The elevator 72 includes rods 73 for penetrating a base frame 21B of the holder 20C corresponding to the insertion holes 26H. The upper surface of the rods 73 is curved to have a slight depression as shown in FIG. 16 and FIG. 17, and in the mode of operation illustrated, the upper surface of the rods 73 receives the respective end parts (the covers CV). Moreover, as shown in FIG. 15, the rods 73 descend to a lowered condition when the lever 71*a* of the toggle handle 71 is pushed downward. As shown in FIG. 16, the upper surface of corresponding rods 73 receive the respective end parts (the covers CV) at positions determined by the supporting boards 24 and 25, and when the lever 71*a* is raised, the respective rods 73 are elevated in accordance with the elevation of the elevator 72 which is constructed and arranged to simultaneously push the corresponding end parts (the covers CV) upwardly. In the example illustrated, an installation board 75 is transversely mounted on the frame body 14 in order to fix the elevator system 70 on the frame body 14. Further, a notch 14*a* is provided in the frame body 14 in order to permit operation of the elevator system 70. In this mode of operation, it is also possible to simultaneously release a plurality of the electric wire-connecting parts WE thereby improving the workability and working-efficiency of the operation.

Figure 18:
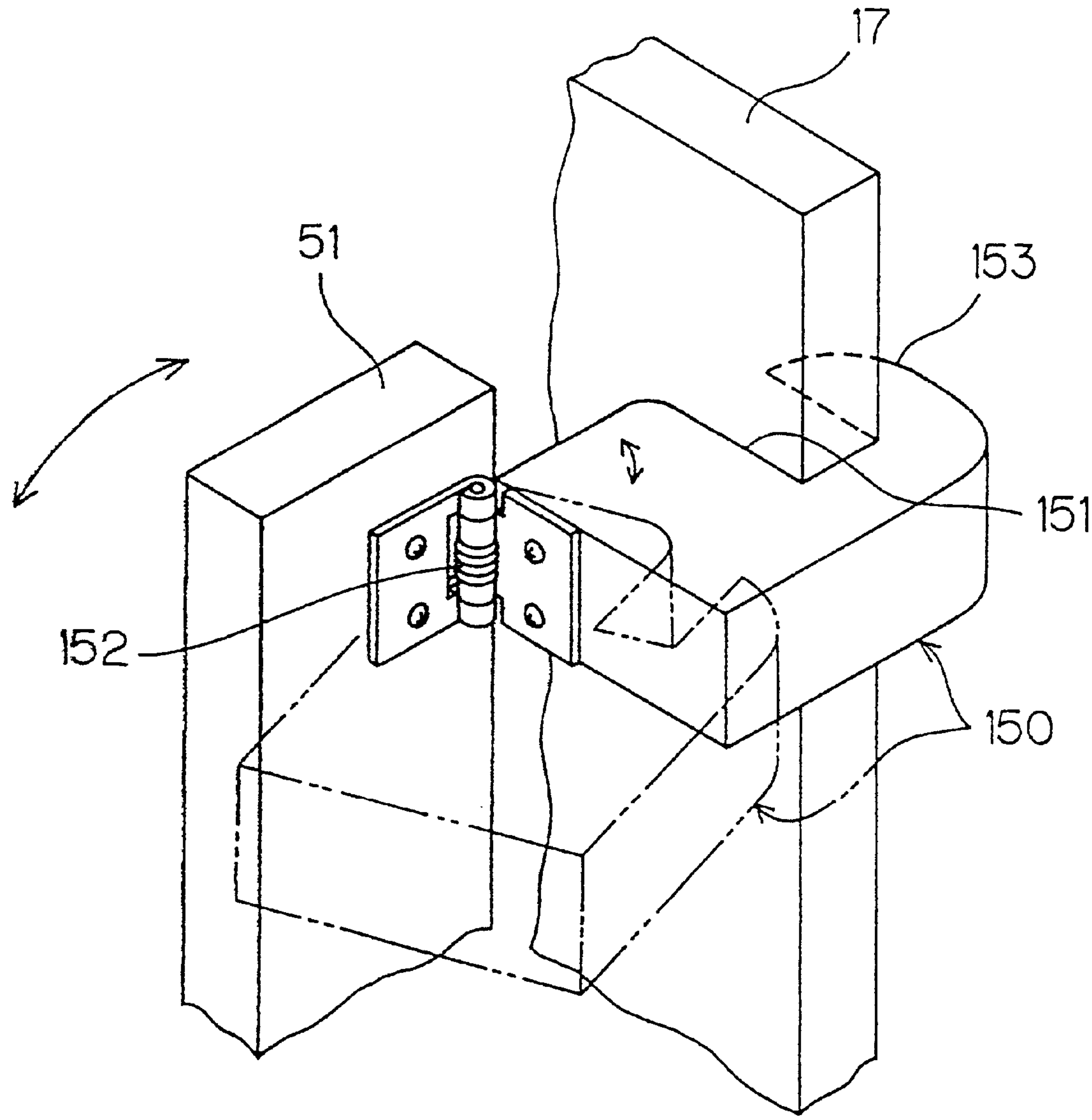
FIG. 18 is a partial perspective view showing the principal part in still another embodiment of the present invention.

Further, it is possible to adopt the embodiment shown in FIG. 18 to the electric wire-sandwiching system. FIG. 18 is a partial perspective view showing the principal part according to a further embodiment of the present invention. Referring to FIG. 18, in the mode of operation shown, a pivoting hook 150 is formed as a block body of any suitable material, for example, aluminum or an aluminum alloy, and partitions a hooking part 151 which is recessed in an approximate U-shape as observed in a plan view. The hooking part 151 is formed to have a rectangular cross-section and is capable of hooking on the side part of the wire-hanging board 17. As shown in FIG. 18, the pivoting arm 51 is designed to be locked by hooking the hooking part 151 on the side part of the wire-hanging board 17.

The pivoting hook 150 is connected on a respective pivoting arm 51 in cantilever fashion through a spring hinge 152, and the hooking part 151 is usually provided in a hooking direction on the side part of the wire-hanging board 17. Further, an arc shaped guide surface 153 inclined relative to a direction to which the end engages the wire-hanging board 17 is formed on the free end of the pivoting hook 150. Accordingly, after the pivoting hook 150 moves back against the force of the spring hinge 152 by a cam action caused by the contact of the guide surface 153 on the side edge of the wire-hanging board 17, the hooking part 151 can be hooked on the side part of the wire-hanging board 17 by moving the pivoting arm 51 to a release position and changing the position to a stopping posture, as shown solid lines in FIG. 18. Thus, the pivoting arm 51 is locked in the stopping position. Further, as shown by the broken lines in FIG. 18, the lock of the pivoting arm 51 is released by rotating the pivoting hook 150 and removing the hooking part 151 from the wire-hanging board 17, and the pivoting arm 51 can be easily moved to the release position.

When the system shown in FIG. 18 is adopted, there is a benefit that the maintenance of a positive locking condition is compatible with high operability independently of the kinds and numbers of the bundles of electric wires WB loaded on the wire-hanging board 17. Further, although an example is not specifically illustrated, and alternative construction of connecting the pivoting pillars 23 with an resilient body may be adopted in place of or in addition to use the spring hinges 27 as a construction for opening and closing the holder. Further, in place of the electric wire-sandwiching system, a construction of respectively clamping the bundles of electric wires WB can be utilized as the bundles of electric wires-hooking part. Further, as the electric wire-sandwiching systems, a construction of hooking on both sides of the wire-hanging board 17 by using a pair of rubber wires may be used in place of pivoting arms.

As illustrated above, according to the present invention, since it is possible to support the bundles of electric wires in a condition in which the fixed dimension from the terminal part is maintained, independently of the length of the bundles of electric wires at the time of hanging in folded condition on the wire-hanging member in order to execute a plural number of processings on the bundles of electric wires, and the mounting and removal of the bundles of electric wires can be easily carried out by a retaining procedure, the remarkable results that the workability is compatible with the maintenance of positioning accuracy and a general purpose property can be further obtained, are exhibited.

Furthermore, according to the present invention, the wire removal process, the terminal connection process, and the covering process can be consistently carried out on the conveying device or transport carrier. Thus, there is no necessity to frequently perform installation and removal work, so that it is possible to form a line which is extremely easily workable and adaptable to automation. Moreover, in the covering process, because the covering work is performed on the conveying device and the position of the liquid surface of the filler is set relative to the heat source by the conveying device, the filler is first solidified from the side of the opening part of the covering material formed in a cap-shaped cover. This results in the filler being solidified in a curing process having a short period of time, and the handling of the bundle of wires is remarkably facilitated.

Accordingly, in the present invention, the handling of the bundle of wires can be easily carried out, and additionally there is a remarkable effect that the handling of the bundles of wires can be facilitated by completing the covering process using the filler in a short period of time.

Also, in the process for heating the filler of the covering material, a pair of reflecting plates opposed to one another are positioned above and below the liquid level of the filler of the cover CV, and the plates are position-set relative to the heat source. Therefore, curing of the filler from the liquid surface is accelerated, thereby providing the advantage that the filler is prevented from leaking even prior to full curing, and the handling work can be remarkably facilitated in a shorter curing process time.

In addition, at the time the position of the heat source is set, the heat source is covered with a hood-shaped reflecting plate which opens only between a pair of supporting plates and the lower supporting plate of the pair is disposed spaced from the liquid surface by the radius of the heat source. Thus, the volume (thermal capacity) of the filler disposed between the supporting plates becomes the smallest condition in the region in which the radiation temperature is high. Accordingly, there is the additional benefit that a greater reduction of the heating time can be expected.

Although the invention has been described with reference to particular means, materials, and embodiments, it is to be understood that the invention is not limited to the particulars disclosed and extends to all equivalents within the scope of the claims.

The present disclosure relates to subject matter contained in priority Japanese Applications No. HEI-10-045955, filed on Feb. 26, 1998, and No. HEI-10-060056, filed on Mar. 11, 1998, which are herein expressly incorporated by reference in their entireties.

What is claimed:

1. A heating device for curing a filler by heating, after covering an electric wire-connecting part which is formed on a terminal of an electric wire bundle by use of a cap-shaped cover into which a fixed amount of liquid filler is preliminarily injected, said heating device comprising:

two heat sources positionable in close, spaced relation to the liquid filler, each of said heat sources being positionable on opposite sides of the cap with the liquid filler;

a hood shaped reflector having reflection boards which open toward the cap with the liquid filler, with a center of each said heat source being positionable at about the same height as the level of filler;

a pair of guide frames that guide a transport carrier having a holder for the cap with the liquid filler into the heating device and between said heat sources, said pair of guide frames positionable on opposite sides of the transport carrier and forming a V-shaped entrance into the heating device and between said heat sources; and a plurality of perpendicularly bent leg members that support said heating device, said plurality of leg members positioned on opposite sides of the transport carrier and configured to receive the transport carrier therebetween.

2. The heating device as recited in claim 1, wherein each said heat source comprises a heating element having a circular cross-section.

3. In combination with the heating device of claim 2, a transport carrier for transportably supporting a bundle of electric wires in which electric wire-connecting parts are formed on one end of each bundle of wires, said transport carrier comprising:

a holder for retaining the electric wire-connecting parts which are formed on respective bundles of electric wires; and wherein said holder retains a bundle of electric wires in a releasable condition by a pair of heat resistant support plates mounted at spaced intervals which permit insertion of the electric wire-connecting parts of the electric wires bundle, and said heating elements are positionable between planes coplanar with the heat resistant support plates.

4. The combination heating device and transport carrier of claim 3, wherein each said heat source comprises a heating element having a circular cross-section, and said heat sources are positionable generally parallel with the pair of heat resistant support plates; and a lower part of the said pair of support plates being spaced downwardly from an upper surface of the level of filler by a radius of the heat source.

5. A heating device and transport carrier combination comprising a heating device for curing a filler by heating, after covering an electric wire-connecting part which is formed on a terminal of an electric wire bundle by use of a cap-shaped cover into which a fixed amount of liquid filler is preliminarily injected, said heating device comprising:

two heat sources positionable in close, spaced relation to the liquid filler, with each of said heat sources being positionable on opposite sides of the cap with the liquid filler, and further including a pair of guide frames for guiding a transport carrier having a holder for the cap with the liquid filler into the heating device and between the heat sources; and a hood shaped reflector having reflection boards which open toward the cap with the liquid filler, with a center of said heat source being positionable at about the same height as the level of filler;

wherein each said heat source comprises a heating element having a circular cross-section; and a transport carrier for transportably supporting a bundle of electric wires in which electric wire-connecting parts are formed on one end of each bundle of wires, said transport carrier comprising:

a holder for retaining the electric wire-connecting parts which are formed on respective bundles of electric wires; and wherein said holder retains a bundle of electric wires in a releasable condition by a pair of heat resistant support plates mounted at spaced intervals which permit insertion of the electric wire-connecting parts of the electric wires bundle, and said heating elements are positionable between planes coplanar with the heat resistant support plates.

6. A heating device and transport carrier combination comprising a heating device for curing a filler by heating, after covering an electric wire-connecting part which is formed on a terminal of an electric wire bundle by use of a cap-shaped cover into which a fixed amount of liquid filler is preliminarily injected, said heating device comprising:

two heat sources positionable in close, spaced relation to the liquid filler, with each of said heat sources being positionable on opposite sides of the cap with the liquid filler, and further including a pair of guide frames for guiding a transport carrier having a holder for the cap with the liquid filler into the heating device and between the heat sources; and a hood shaped reflector having reflection boards which open toward the cap with the liquid filler, with a center of said heat source being positionable at about the same height as the level of filler; and a transport carrier for transportably supporting a bundle of electric wires in which electric wire-connecting parts are formed on one end of each bundle of wires, said transport carrier comprising:

a holder for retaining the electric wire-connecting parts which are formed on respective bundles of electric wires;

wherein said holder retains a bundle of electric wires in a releasable condition by a pair of heat resistant support plates mounted at spaced intervals which permit insertion of the electric wire-connecting parts of the electric wires bundle, and said heating elements are positionable between planes coplanar with the heat resistant support plates;

wherein each said heat source comprises a heating element having a circular cross-section, and said heat sources are positionable generally parallel with the pair of heat resistant support plates; and a lower part of said pair of support plates being spaced downwardly from an upper surface of the level of filler by a radius of the heat source.

* * * * *